United States Patent
Radakovitz et al.

(10) Patent No.: US 10,540,435 B2
(45) Date of Patent: Jan. 21, 2020

(54) DECKS, CARDS, AND MOBILE UI

(71) Applicant: Microsoft Technology Licensing, LLC, Redmond, WA (US)

(72) Inventors: Samuel C. Radakovitz, Seattle, WA (US); John Campbell, Woodinville, WA (US); Catherine Neylan, Seattle, WA (US); Matthew Fichtner, Seattle, WA (US); Alexander Livingston, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/340,627

(22) Filed: Nov. 1, 2016

(65) Prior Publication Data

US 2017/0124055 A1    May 4, 2017

Related U.S. Application Data

(60) Provisional application No. 62/249,903, filed on Nov. 2, 2015.

(51) Int. Cl.
*G06F 17/00* (2019.01)
*G06F 17/24* (2006.01)
*G06F 3/0481* (2013.01)
*G06F 3/0482* (2013.01)
*G06F 3/0488* (2013.01)

(52) U.S. Cl.
CPC .......... *G06F 17/246* (2013.01); *G06F 3/0482* (2013.01); *G06F 3/0488* (2013.01); *G06F 3/04817* (2013.01)

(58) Field of Classification Search
CPC .................................................... G06F 17/246
See application file for complete search history.

(56) References Cited

U.S. PATENT DOCUMENTS

| | | | |
|---|---|---|---|
| 6,002,865 A * | 12/1999 | Thomsen | G06F 17/246 |
| 6,523,040 B1 | 2/2003 | Lo et al. | |
| 6,675,351 B1 | 1/2004 | Leduc | |
| 7,032,181 B1 | 4/2006 | Farcasiu | |
| 7,779,346 B2 | 8/2010 | Buczek | |
| 7,966,271 B2 | 6/2011 | Liu et al. | |

(Continued)

FOREIGN PATENT DOCUMENTS

EP    1645972 A2    4/2006

OTHER PUBLICATIONS

Tajima et al., "Browsing Large HTML Tables on Small Screens," copyright 2008 ACM, p. 259-268. (Year: 2008).*

(Continued)

*Primary Examiner* — Amelia L Tapp

(57) ABSTRACT

The present disclosure provides a novel approach to displaying spreadsheets on mobile devices (e.g., cell phones, tablets, etc.) so that they are more easily viewable by the user. Aspects of the present disclosure provide multiple different views of a spreadsheet and simple transitions among those views. The multiple views facilitate the display of important aspects of a spreadsheet and optimize the spreadsheet viewing area. In particular, deck and card views are disclosed, wherein each view corresponds to a different display format of the spreadsheet. Furthermore, editing the spreadsheet data is also provided within these views.

20 Claims, 26 Drawing Sheets

(56) References Cited

U.S. PATENT DOCUMENTS

| | | | |
|---|---|---|---|
| 8,127,223 B2 | 2/2012 | Becerra, Sr. et al. | |
| 2005/0086259 A1* | 4/2005 | Eschbach | G06F 17/211 |
| 2009/0187815 A1* | 7/2009 | Becerra, Sr. | G06F 3/04815 715/212 |
| 2009/0313537 A1* | 12/2009 | Fu | G06F 17/30905 715/212 |
| 2010/0095240 A1* | 4/2010 | Shiplacoff | G06F 3/0483 715/784 |
| 2010/0257438 A1 | 10/2010 | Becerra, Sr. et al. | |
| 2013/0067306 A1* | 3/2013 | Bhargav | G06F 17/24 715/220 |
| 2013/0162670 A1* | 6/2013 | Singh | G09G 5/14 345/629 |
| 2014/0055495 A1 | 2/2014 | Kim et al. | |
| 2014/0173043 A1 | 5/2014 | Matas | |
| 2014/0279373 A1* | 9/2014 | Saraf | G06Q 40/04 705/37 |
| 2014/0372906 A1 | 12/2014 | Campbell et al. | |
| 2016/0026616 A1* | 1/2016 | Vogel | G06F 17/246 715/219 |
| 2016/0078002 A1* | 3/2016 | Hailpern | G06F 17/246 715/209 |
| 2016/0117308 A1* | 4/2016 | Haider | G06F 17/246 715/217 |

OTHER PUBLICATIONS

Watters et al., "Comparing Table Views for Small Devices," 2005 ACM Symposium on Applied Computing, USA, p. 975-80. (Year: 2005).*

PCT International Search Report and Written Opinion in International Application PCT/US2016/060032, dated Mar. 14, 2017, 16 pgs.

Xu, Wenchang et al., "Anabline Efficient Browsing and Manipulation of Web Tables on Smartphone", in "Lecture Notes in Computer Science", Jan. 2011, Springer Berlin, vol. 6763, pp. 117-126.

Campos, M. M et al., "Data-Centric Automated Data Mining", Machine Learning and Applications Proceedings, 2005, 4th Int'l Conference in Los Angeles, CA, Dec. 15-17, 2005, pp. 97-104.

Fern, et al., "Trends on Tuesday: 8 Ways to Format Tables for Responsive Web Design", Published on: Oct. 28, 2014 Available at: http://www.digitalgov.gov/2014/10/28/trends-on-tuesday-8-ways-to-format-tables-for-responsive-web-design/, 5 pgs.

Powell, Rick, "Tables in Responsive Design", Published on: Dec. 10, 2013 Available at: https://www.liquidlight.co.uk/blog/article/tables-in-responsive-design/, 10 pgs.

Watters, et al., "Comparing Table Views for Small Devices", In Proceedings of ACM Symposium on Applied Computing, Mar. 13, 2005, pp. 975-980.

"List, Grid & Gantt Views in the Android app", Published on: Sep. 13, 2015 Available at: http://help.smartsheet.com/customer/portal/articles/1418815-list-grid-gantt-views-in-the-android-app, 4 pgs.

Potla, et al., "Adapting Web Page Tables on Mobile Devices", In International Journal of Handheld Computing Research, vol. 3, Issue 1, Jan. 2012, 2 pages.

Vialard, et al., "Awesome Tables", Published on: Aug. 22, 2015 Available at: https://sites.google.com/site/scriptsexamples/available-web-apps/awesome-tables#TOC-Related-Files, 9 pgs.

"Second Written Opinion Issued in PCT Application No. PCT/US2016/60032", dated Sep. 11, 2017, 8 Pages.

"International Preliminary Report on Patentability Issued in PCT Application No. PCT/US2016/60032", dated Jan. 2, 2018, 9 Pages.

* cited by examiner

FIG. 6E

DECKS, CARDS, AND MOBILE UI

CROSS-REFERENCE TO RELATED APPLICATIONS

The present application claims priority to U.S. Provisional Patent Application No. 62/249,903, filed Nov. 2, 2015 and entitled "Decks, Cards, and Mobile UI," the disclosure of which is hereby incorporated by reference in its entirety.

BACKGROUND

Spreadsheets may incorporate hundreds of rows and columns of data and when displayed on a mobile device, those spreadsheets may be cumbersome to view. In particular, due to the limited display capacity of mobile devices, viewing spreadsheets thereon requires users to scroll in multiple directions just to view a single column or row of data. For larger spreadsheets, it is oftentimes difficult to appreciate the size of the spreadsheet when viewed from the display of a mobile device. Still further, editing spreadsheets on a mobile device is generally cumbersome and easy to make mistakes. It is with respect to these and other general considerations that embodiments have been described.

SUMMARY

The present disclosure is directed to systems and methods for displaying spreadsheets on mobile devices (e.g., cell phones, tablets, etc.) so that they are more easily viewable by the user. Aspects of the present disclosure provide multiple different views of a spreadsheet and simple transitions among those views.

In a first aspect, a computer implemented method for generating a deck view on a mobile computing device is disclosed. The method comprising: receiving, at the mobile computing device, a spreadsheet storing data that is organized according to a plurality of rows and associated with a plurality of columns; generating a deck view including at least one row object, wherein each of the at least one row objects represents one of the plurality of rows and includes information from two or more of the associated plurality of columns; and displaying the deck view on the mobile computing device.

In a second aspect, a computer implemented method for generating a card view on a mobile computing device is disclosed. The method comprising: receiving, at the mobile computing device, a spreadsheet storing data that is organized according to a plurality of rows and associated with a plurality of columns; generating a card view including a row object, wherein the row object represents one of the plurality of rows and includes cell information associated with two or more of the associated plurality of columns; and displaying the card view on the mobile computing device.

In a third aspect, a system comprising: at least one processing unit; and at least one memory storing computer executable instructions that, when executed by the at least one processing unit, cause the system to perform a method is disclosed. The method comprising: receiving, at the mobile computing device, a spreadsheet storing data that is organized according to a plurality of rows and associated with a plurality of columns; in response to receiving, at the mobile computing device, a selection to display a deck view: generating a deck view including at least one row object, wherein each of the at least one row objects represents one of the plurality of rows and includes information from two or more of the associated plurality of columns; and displaying the deck view on the mobile computing device; and in response to receiving, at the mobile computing device, a selection to display a card view: generating a card view including a row object of the at least one row object, wherein the row object represents one of the plurality of rows and includes cell information associated with two or more of the associated plurality of columns; and displaying the card view on the mobile computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 6E illustrates switching between column card view and row card view, according to an example embodiment.

DETAILED DESCRIPTION

Figure 1:
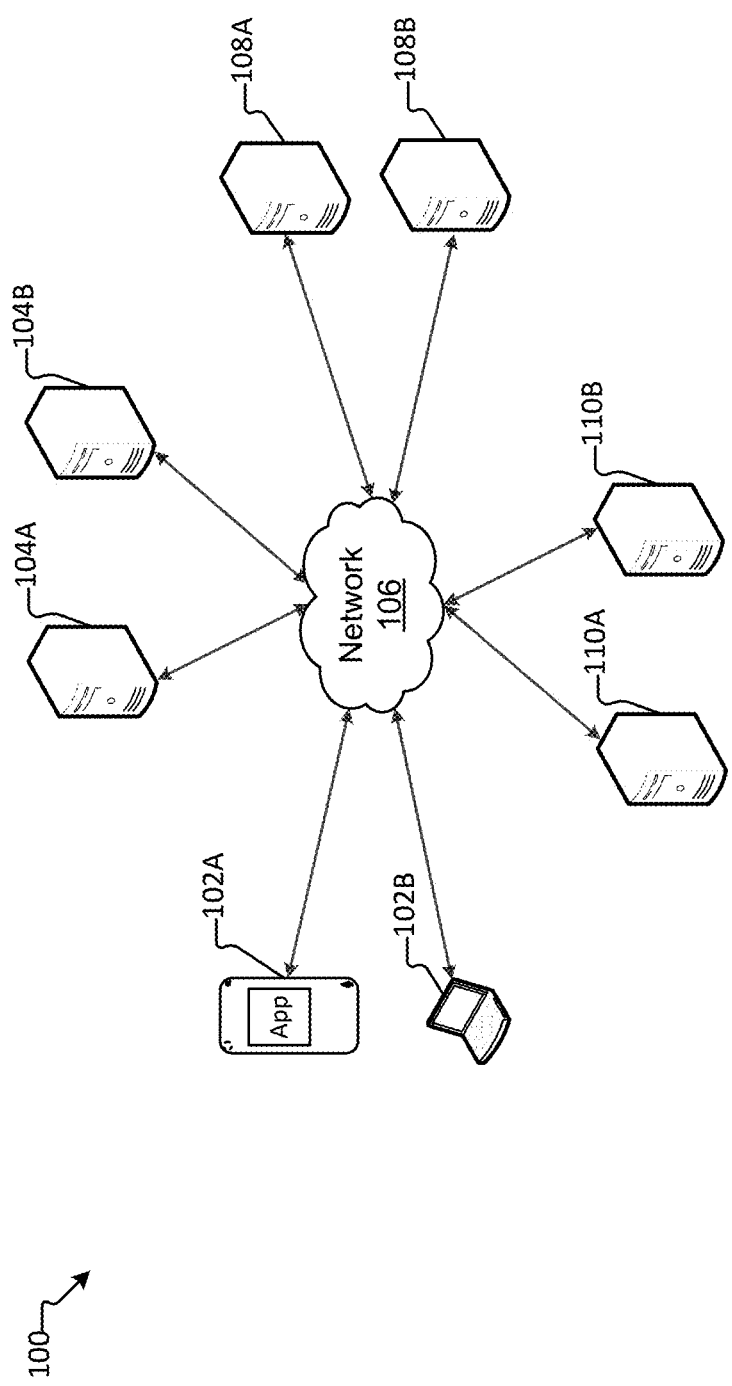
FIG. 1 illustrates a system for implementing a spreadsheet application on a mobile device, according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure provides a novel approach to displaying spreadsheets on mobile devices (e.g., cell phones, tablets, etc.) so that they are more easily viewable by the user. Aspects of the present disclosure provide multiple different views of a spreadsheet and simple transitions among those views. The multiple views facilitate the display of important aspects of a spreadsheet and optimize the spreadsheet viewing area. In particular, deck and card views are disclosed, wherein each view corresponds to a different display format of the spreadsheet. Furthermore, editing the spreadsheet data is also provided within these views. These disclosed views greatly improve a user's interactions with a spreadsheet on a mobile device.

FIG. 1 illustrates a system for implementing a spreadsheet application on a mobile device, according to an example embodiment.

As illustrated, system 100 may include one or more client computing devices 102 (e.g., client computing devices 102A and 102B) that may execute a client version of the disclosed spreadsheet application. In some examples, the client spreadsheet application may execute locally on a client computing device 102. In other examples, a client spreadsheet application (e.g., a mobile app on a thin client computing device 102) may operate with a corresponding server version of spreadsheet application executing on one or more server computing devices. In such embodiments, the client computing device 102 may communicate with the corresponding server version of the spreadsheet application executing on one or more servers (e.g., server 104A and 104B) over a network (e.g., network 106). In still other aspects, rather than executing a client version of a spreadsheet application, the one or more client computing devices 102 may remotely access, e.g., via a browser over a network (e.g., network 106), the spreadsheet application implemented on a server computing device or multiple server computing devices (e.g., in a distributed computing environment such as a cloud computing environment).

In a basic configuration, the one or more client computing devices 102 are personal or handheld computers having both input elements and output elements operated by one or more users. For example, the one or more client computing devices 102 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing devices as described herein may communicate with some components of the system via a local network (e.g., an enterprise intranet), whereas such server computing devices may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As further illustrated, the client computing device 102 may be connected to one or more local databases (e.g., local database 108A and 108B) storing information that can be imported by the client computing device 102. The local database 108 may be a local database accessible over, for example, a local area network (e.g, network 106). The local database 108 may be maintained and operated by a local party affiliated with the client computing device 102 and can store information that can be imported by the spreadsheet application. The databases could also be located on the same device 102 as the spreadsheet, such as, for example, a database locally stored on a user's desktop.

As further illustrated, the client computing device 102 may be connected to one or more third party databases (e.g., database 110A and 110B) storing information that can be imported by the client computing device 102. The third party database 110 may be accessible over, for example, a Wide Area Network such as the Internet (e.g, network 106). The third party database 110 may be maintained and operated by any third party company or organization and may store information that can be imported by the spreadsheet application.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
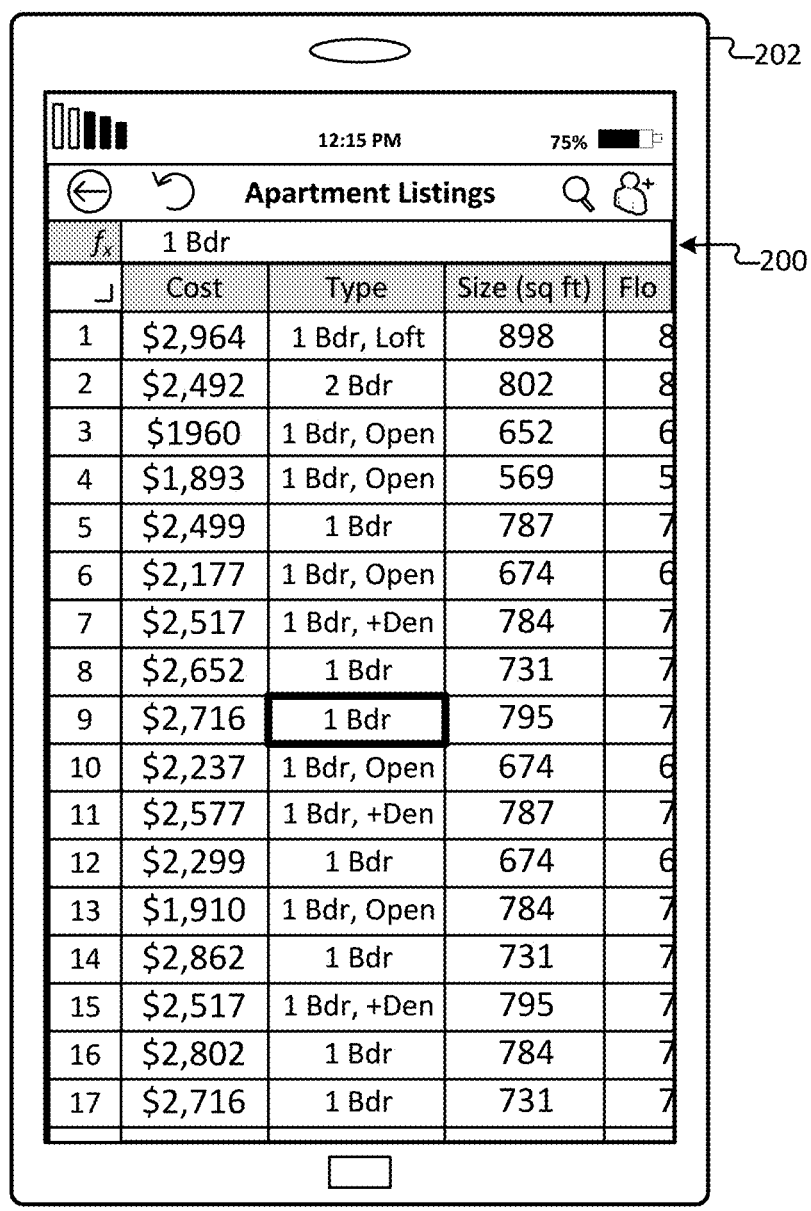
FIG. 2 illustrates a grid view of a spreadsheet as displayed on a mobile device, according to an example embodiment.

FIG. 2 illustrates a grid view 200 of a spreadsheet as displayed on a mobile device 202, according to an example embodiment.

In this example, a grid view 200 of a spreadsheet application is disclosed. The grid view displays a spreadsheet of a spreadsheet application, as viewed from a mobile device 202 such as, for example, a mobile phone. In this example, the grid view 200 includes all the rows and columns of the spreadsheet. Because the grid view 200 displays all the data stored in the spreadsheet, the user must scroll right, left, up, and down, to view the data, which may cause the user to lose track of the position within the spreadsheet the user is viewing. The grid view 200 therefore does not easily facilitate scrolling through or viewing important aspects of the spreadsheet.

Figure 3:
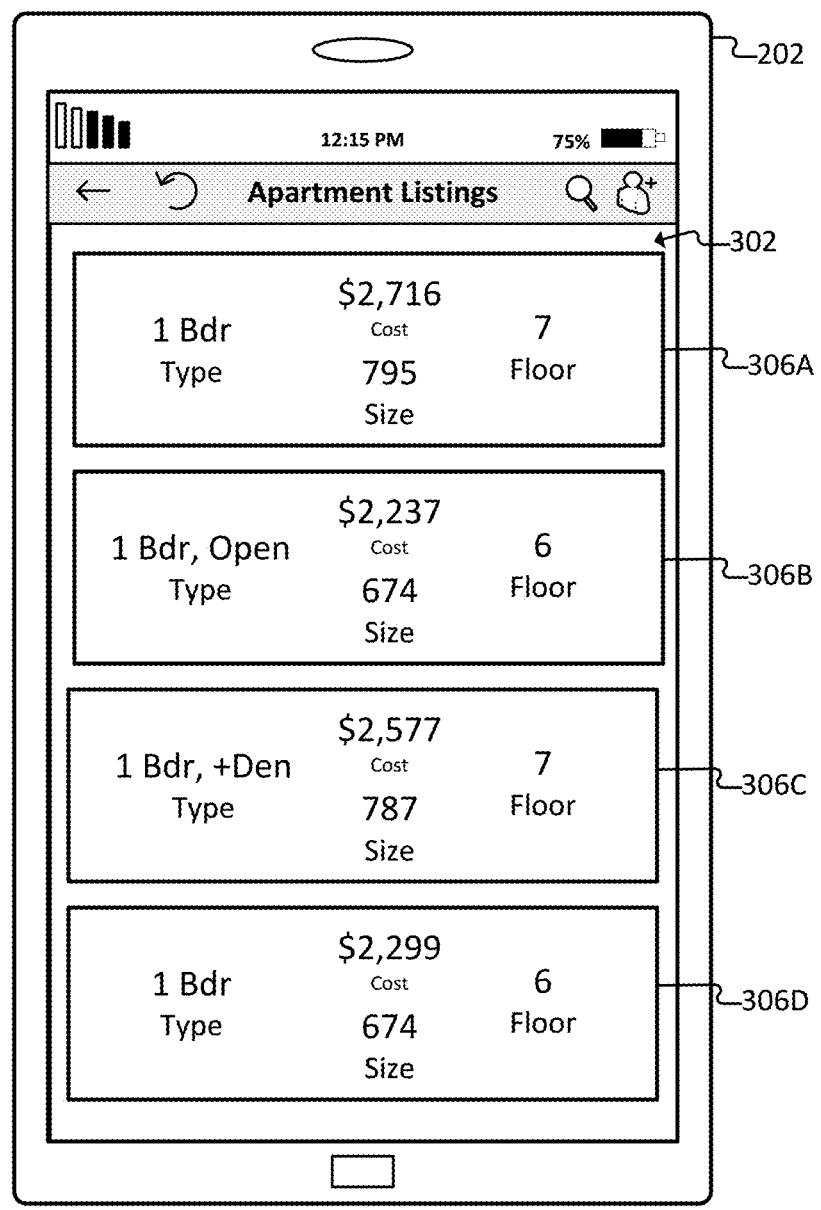
FIG. 3 illustrates a deck view of a spreadsheet as displayed on a mobile device, according to an example embodiment.

FIG. 3 illustrates a deck view 302 of a spreadsheet as displayed on a mobile device 202, according to an example embodiment.

In example embodiments, the deck view 302 displays one or more rows of a spreadsheet as a scrollable list. In particular, the deck view 302 displays one or more row objects of the spreadsheet, wherein each row object further displays information from, or information related to, one or more cells within that row. In the example illustrated in FIG. 3, the deck view 302 displays four row objects 306, wherein each row object represents a row of a spreadsheet (e.g., row object 306A represents row 9, row object 306B represents row 10, row object 306C represents row 11, and row object 306D represents row 12). Furthermore, in the example, each row object 306 displays information from, or information related to, multiple cells within that row. In particular, each row object (e.g., row objects 306A-306D corresponding to rows 9-12 of the spreadsheet) displays values stored in four cells of that row as well as the associated column header value (e.g., column headers "Type," "Cost," "Size," and "Floor"). In some embodiments, the values may only include the value stored in a particular cell of that row and does not include the associated header value. Accordingly, as illustrated, the deck view 302 provides a simpler, more easily consumable display of spreadsheet data on a mobile device having limited display capacity. Although rows and columns are described herein, it is understood that usage of those terms depends on the orientation of the data stored in the spreadsheet. For purposes of describing example illustrations, one orientation will be described, but it is not intended to limit the scope of the present disclosure.

In some embodiments, the spreadsheet application displays, in the deck view 302, more important aspects of a spreadsheet. More particularly, in some examples, the spreadsheet application displays, in each row object 306, information from, or information related to, cells of the first few columns of the spreadsheet. In other embodiments, the spreadsheet application displays, in each row object 306, information from, or related to, cells of columns selected by the user. Accordingly, the deck view 302 displays cells from rows of data in an easier to consume, logical, and singular format. Depending on the size of the spreadsheet, one or more rows may appear off screen, which can be viewed by, for example, scrolling or swiping up, down, left, or right. The deck view 302 therefore also provides a simple approach to scrolling through the spreadsheet to view data stored therein.

The deck view 302 provides an initial peek into the data stored in the spreadsheet. As will be described in further detail herein, in order to view the spreadsheet in the deck view 302 on a mobile device 202, a user may select, for example, a button or gesture from the grid view or the card view, which is described in further detail herein, in order to view the spreadsheet in the deck view 302. In one implementation from within the grid view, the user is presented a selectable option to view the spreadsheet in the deck view, and upon selection of that option, the system reorganizes the data stored therein to display the spreadsheet in the disclosed deck view 302. Alternatively or additionally, the deck view 302 may be set as the default view when a spreadsheet is opened on a mobile device. Further aspects of the deck view are described in further detail herein. Alternatively or additionally, selection of one or more rows (or columns) may cause the mobile device to display the spreadsheet in the deck view. Alternatively or additionally, a selection to generate the deck view may be received from one or more tables, pivot tables, ranges in the grid view, sparsely populated ranges that are roughly rectangular, etc.

Figure 4:
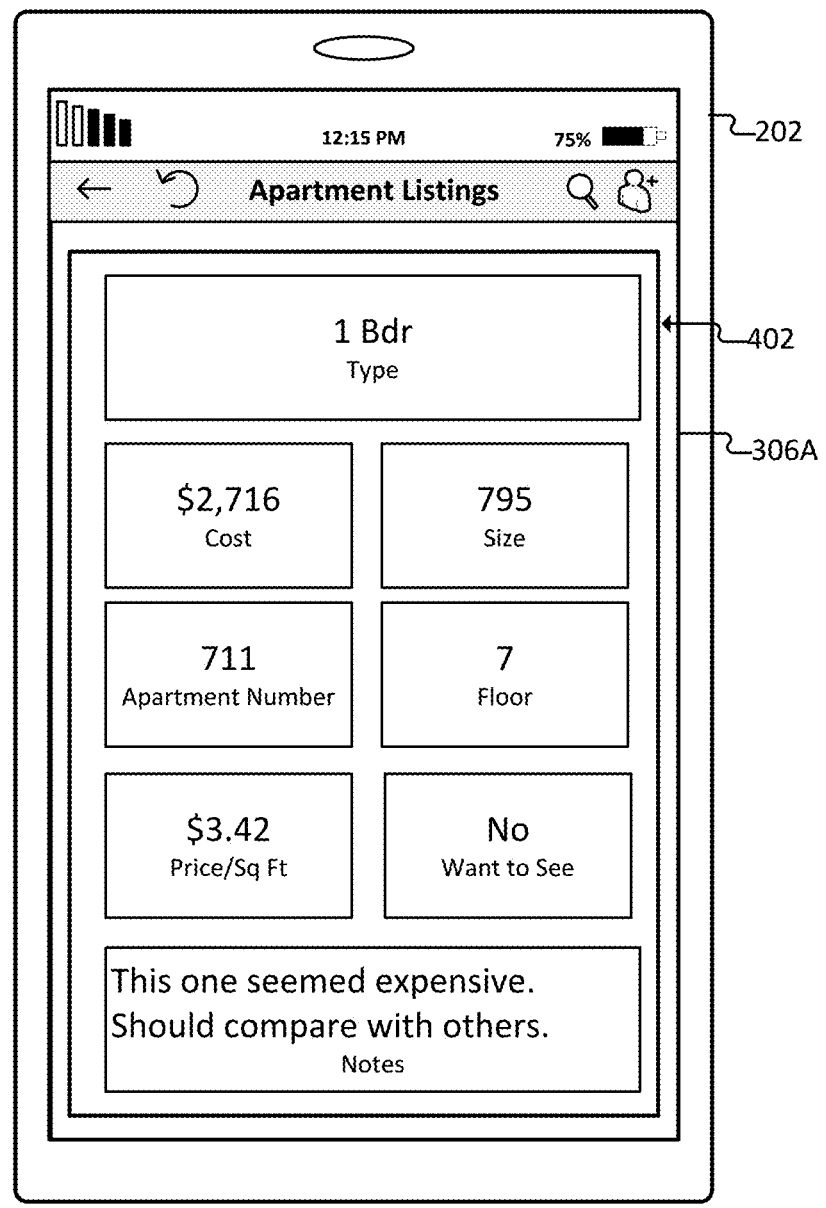
FIG. 4 illustrates a card view of a spreadsheet as displayed on a mobile device, according to an example embodiment.

FIG. 4 illustrates a card view 108 of a spreadsheet as displayed on a mobile device 202, according to an example embodiment.

In an example, the card view 402 displays a single row of the spreadsheet. In particular, the card view 402 displays a single row of the spreadsheet, and includes information from, or information related to, one or more cells within that row. In some embodiments, the card view is displayed in response to a selection of a particular row from the deck view or the grid view. In other embodiments, the card view can be displayed in response to a selection from another user interface. In the example illustrated in FIG. 4, the mobile device 202 displays the card view 402 for row object 306A representing row 9 of the spreadsheet illustrated in FIG. 2. Furthermore, row object 306A displays information from, or information related to, multiple cells within that row. In particular, row object 306A displays values stored in eight cells of that row as well as the associated column header value (e.g., column headers "Type," "Cost," "Size," "Floor," "Apartment Number," "Price/Sq Ft," "Want to See," and "Notes"). In some embodiments, the values may only include the value stored in a particular cell of that row and does not include the associated header value. Accordingly, the example card view 402 displays even more information of a row within the spreadsheet than either the grid view 200 or the deck view 302. Depending on the size of the spreadsheet, the card view 402 may display an equivalent number of information from cells as displayed in the deck view 302. However the card view 402, in this example, occupies most of the display of the mobile device 202, thereby providing a larger viewing area from which to view the contents of a spreadsheet row. Thus, as shown, the card view provides a user friendly approach to display a single row of a spreadsheet on a mobile device. In some embodiments, the card view 402 displays information from, or information related to all the cells of a single row, and other embodiments, the card view displays information from, or information related to fewer than all the cells of a single row. Furthermore, although the example card view 402 shown displays values stored in eight cells of that row as well as the associated column header value, it is understood that the card view may display more cells and associated header value information that might be off the display, but viewable by scrolling or swiping up, down, left, right, or diagonally on the display.

Consistent with aspects of the present disclosure, information to include in this view may be selected using default parameters (e.g., showing the first five columns of the row, showing all the columns of the row, etc.), information may be selected using analytics that assess the most important information of a single row, or information may be selected and customized by the user. Still further, the organization of the data may be generated by default, based on various settings, or customized by the user, as will be described in further detail herein. Similar to the description with reference to the deck view, although rows and columns are described herein, it is understood that usage of those terms depends on the orientation of the data stored in the spreadsheet. For purposes of describing example illustrations, one orientation will be described, but it is not intended to limit the scope of the present disclosure. Furthermore, in some embodiments, if images are included in the spreadsheet, such images may be displayed such that they are more or less visible to a user.

The card view 402 provides a more detailed look into the data stored in the spreadsheet. As will be described in further detail herein, in order to view the spreadsheet in the card view 402 on a mobile device 202, a user may select, for example, a button or gesture from the grid view or the deck view in order to view the spreadsheet in the card view 402. In one implementation from within the grid view, the user is presented a selectable option to view the spreadsheet in the card view, and upon selection of that option, the system reorganizes the data stored therein to display the spreadsheet in the disclosed card view 402. Alternatively or additionally, the card view 402 may be set as the default view when a spreadsheet is opened on a mobile device. Further aspects of the card view are described in further detail herein. Alternatively or additionally, selection of a single row (or column) may cause the mobile device to display the spreadsheet in the card view.

Furthermore, the card view as described herein, displays a single row or column of data in a scaled up view, and thus allows a user to more easily view and edit data at a lower level of granularity. As will also be described in further detail herein, the user may also easily swipe or scroll up, down, right, and left to display the card view of adjacent rows. Because the card view provides greater visibility of each cell of a spreadsheet row on a mobile device screen than would be seen from the grid view, a user may easily read and more easily edit those cells. As will also be described in greater detail herein, a user may also add or delete cells from the card view, which is also applied to the underlying spreadsheet. As will be further described, a user may also easily reorganize the information displayed in the card view. Furthermore, as will also be described further, the user can perform different commands from the card view.

In some embodiments, a user may select any view without transitioning over multiple views. For example, a user may jump from the grid view to the card view, from the grid view to the deck view, from the deck view to the card view, or from the card view to the deck view. Alternatively or additionally, the user may navigate from grid view, to deck view, then to card view. Accordingly, in such implementations the user may view the spreadsheet data in any view from any view. Alternatively or additionally, a selection to generate the card view may be received from one or more tables, pivot tables, ranges in the grid view, sparsely populated ranges that are roughly rectangular, etc.

Furthermore, a dashboard may be displayed in the card view, providing a summary view of the spreadsheet showing additional features such as, for example, charts or graphs of the data the user is currently viewing. Alternatively or additionally, other information may be shown such as, for example, description information, metadata, title, etc., wherein such information relates to the entire deck, and therefore, is displayed in the dashboard of all the cards.

Figure 5A:
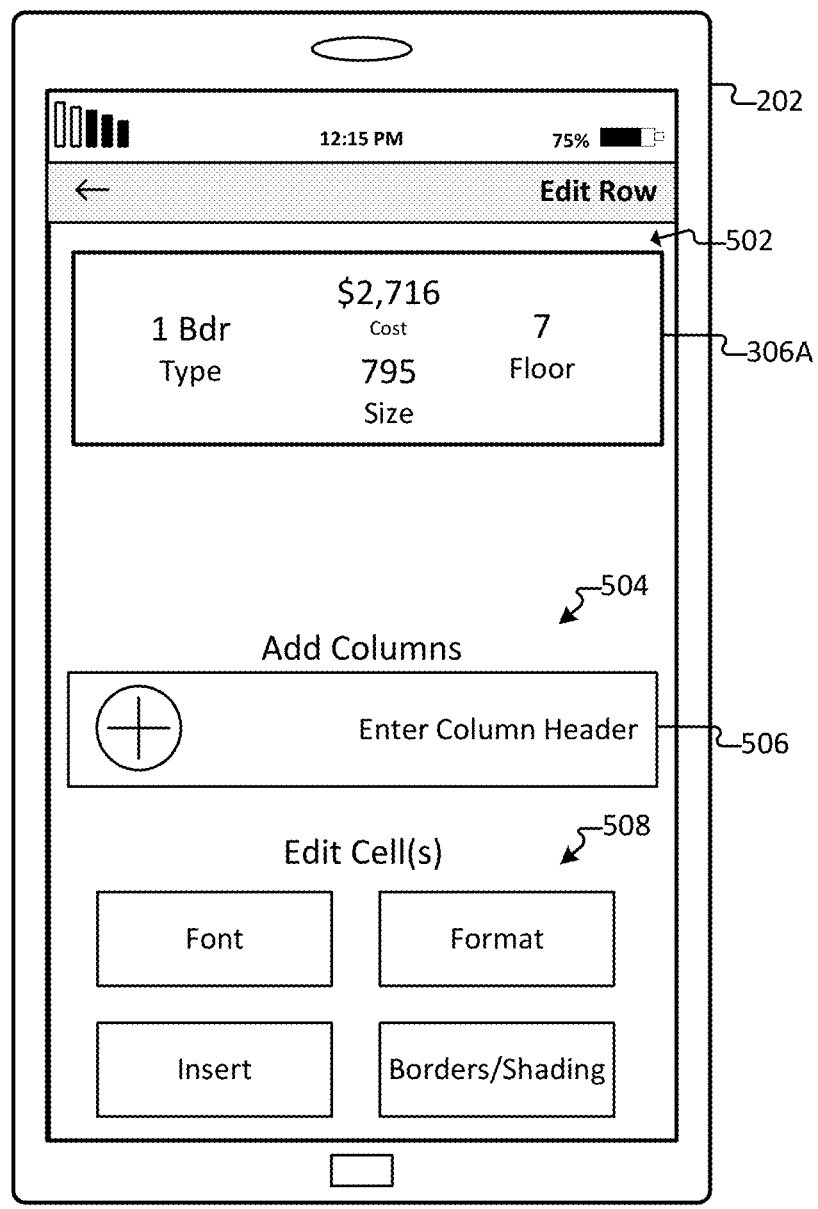
FIG. 5A illustrates editing a spreadsheet from the deck view as displayed on a mobile device, according to an example embodiment.

FIG. 5A illustrates editing a spreadsheet from the deck view 502 as displayed on a mobile device 202, according to an example embodiment.

The deck view displays one or more rows of the spreadsheet, wherein each row further displays information from, or information related to, one or more cells within that row. As described herein, information stored in the spreadsheet can be edited and information can be added to the spreadsheet, from the various views, including from the deck view. In this example, the mobile device 202 displays the deck view 502 of a spreadsheet, wherein the deck view 502 includes an edit user interface 504. In some embodiments, the edit user interface 504 may be viewed by selection of, for example, option to edit the spreadsheet displayed on the mobile device 202. In this example, the edit user interface 504 further includes an add column option 506 and cell editing options 508. The add column option 506, for example, allows the addition of one or more columns to the entire spreadsheet or to a particular row. Adding a column, in turn, adds an additional cell to each row of the spreadsheet or to an individual row. In embodiments, the add column option 506 allows the addition of a single column to one or more rows. Alternatively or additionally, the add column option 506 allows the addition of multiple columns to one or more rows. Alternatively or additionally, the add column option 506 further allows the user to specify the column header associated with the new column. In some embodiments, the add column option 506 also allows the user to add information to the cell created by addition of the new column. Any new columns (and hence cells) created by the add column option 506 is also applied to the underlying spreadsheet.

The cell editing options 508 allow editing of one or more cells or one or more rows of the spreadsheet. In the example illustrated, the cell editing options 508 allows the user to edit the font and format of one or more cells as well as insert objects (e.g., objects, pictures, graphs, tables, charts, etc.) and borders/shading. In some embodiments, editing may be performed by selecting, from the deck view, one or more rows, which would edit each cell within the selected row. In other embodiments, editing may be performed by selecting, from the deck view, one or more cells of a single or multiple rows, which would edit the selected cells. Any edits performed using the cell editing options 508 is also applied to the underlying spreadsheet. Although editing options such as font, format, borders/shading, and insert are illustrated, it is understood that these editing features are exemplary only and are not intended to limit the scope of the present disclosure.

In some embodiments, the ability to edit the spreadsheet from the deck view may be dependent upon factors, such as, for example, screen size, user settings, amount of data shown, or the type of data to be edited, etc. Other factors may also be relevant.

Figure 5B:
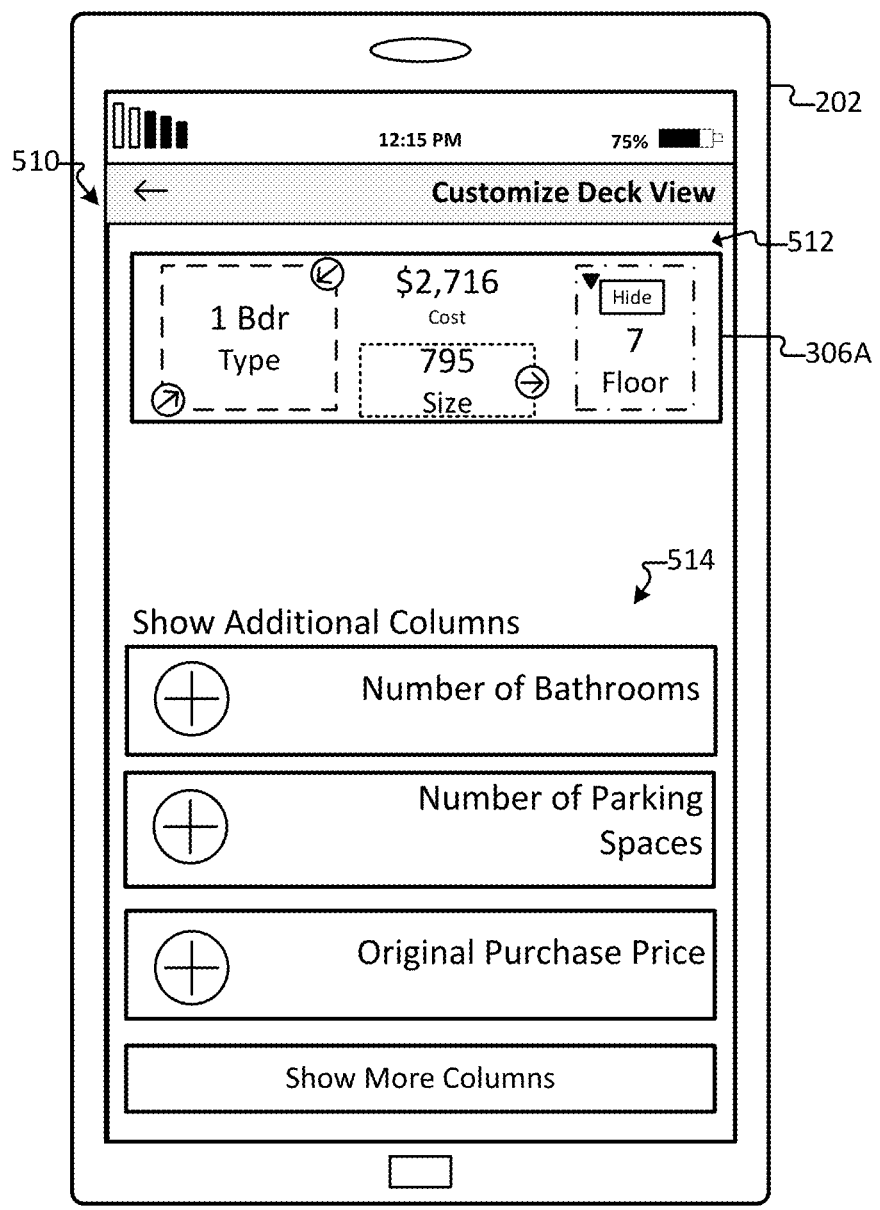
FIG. 5B illustrates a deck view customization screen, according to an example embodiment.

FIG. 5B illustrates a deck view customization screen 510, according to an example embodiment.

In embodiments, the arrangement of the information displayed in the deck view may be edited. Additionally or alternatively, information may be hidden from the deck view or additional information may be added to the deck view. Furthermore, information may be resized. In the example illustrated in FIG. 5B, a deck view customization screen 510 is displayed on the mobile device 202. In this example, the deck view customization screen 510 displays the deck view 512 and the show additional columns option 514.

The example deck view customization screen 510 provides the user with the flexibility to choose the fields they want to see in the deck view and the arrangement. In some embodiments, a default deck view is set, such as, for example, a display of the first five columns of the spreadsheet, however, in other embodiments, other default settings may be used. Alternatively, aspects of the present disclosure provide for a scan of the spreadsheet and the use of machine learning to power analytics to identify the most relevant data contained in the spreadsheet to display in the deck view.

Alternatively or additionally, algorithms can also be applied. For example, an algorithm that analyzes header values may be used to identify the most important fields of a row (or column depending on the organization of the spreadsheet). Alternatively or additionally, an algorithm may be applied to identify which fields are most frequently edited. Alternatively or additionally, the user may define which columns or rows to display in the deck view.

In this example, the deck view 512 within the deck view customization screen 510 displays a row object (e.g., row object 306A representing row 9 of the spreadsheet) (although multiple rows may be displayed from the deck view 512), wherein the row further displays information from, and information related to, four cells within that row. As described herein, information displayed in the deck view may be rearranged, resized, hidden, and added. In this embodiment, the "1 BDR" cell information that corresponds to the column heading "Type" may be resized. In some embodiments, the information may be resized by selecting a resize option or selecting the information from the touch sensitive display and pinching to enlarge or reduce the size of the information. In some embodiments, selecting the information may automatically and temporarily outline the information as the information is being resized, as indicated by the dashed line, so as to inform the user of the resize. In some embodiments, such change in size may also automatically change the information font.

Also shown in this example is the "795" cell information corresponding to the column heading "Size" that may be moved to another area within the deck view 512. In some embodiments, the information may be moved by selecting a move option or by selecting the information from the touch sensitive display and moving the information to the desired position within the deck view 512. In some embodiments, selecting the information to be moved may automatically and temporarily outline the information as the information is being moved, as indicated by the dotted line, so as to inform the user of the move.

Also shown in this example is the "7" cell information corresponding to the column heading "Floor" that may be hidden or deleted from the deck view 512 without actually deleting the underlying data. Rather, the hide/delete functionality hides the information from the deck view. Deleting data may also be performed, as will be described in further detail herein. In some embodiments, the information may be hidden by selecting a hide option from a menu. In other embodiments, information may be hidden by selecting the information from the touch sensitive display and dragging the information from the row of the deck view 512. In some embodiments, selecting the information to be hidden may automatically and temporarily outline the information, as indicated by the dotted-dashed line, so as to inform the user that the selected information is to be hidden.

In this example, the deck view customization screen 510 further includes a show additional columns option 514 in which additional information may be added to the deck view 512. In particular, additional columns from the spreadsheet that are not shown in the deck view 512 may be added. Based on a selection of one or more columns from the show additional columns option 514, the associated cell information may be displayed for each row displayed in the deck view 512.

In some embodiments, the information arranged or reorganized in the deck view may be independent from, and might not affect the information displayed (and the associated arrangement) in the card view. Alternatively, the changes to the organization of the deck view may affect the card view.

Figure 5C:
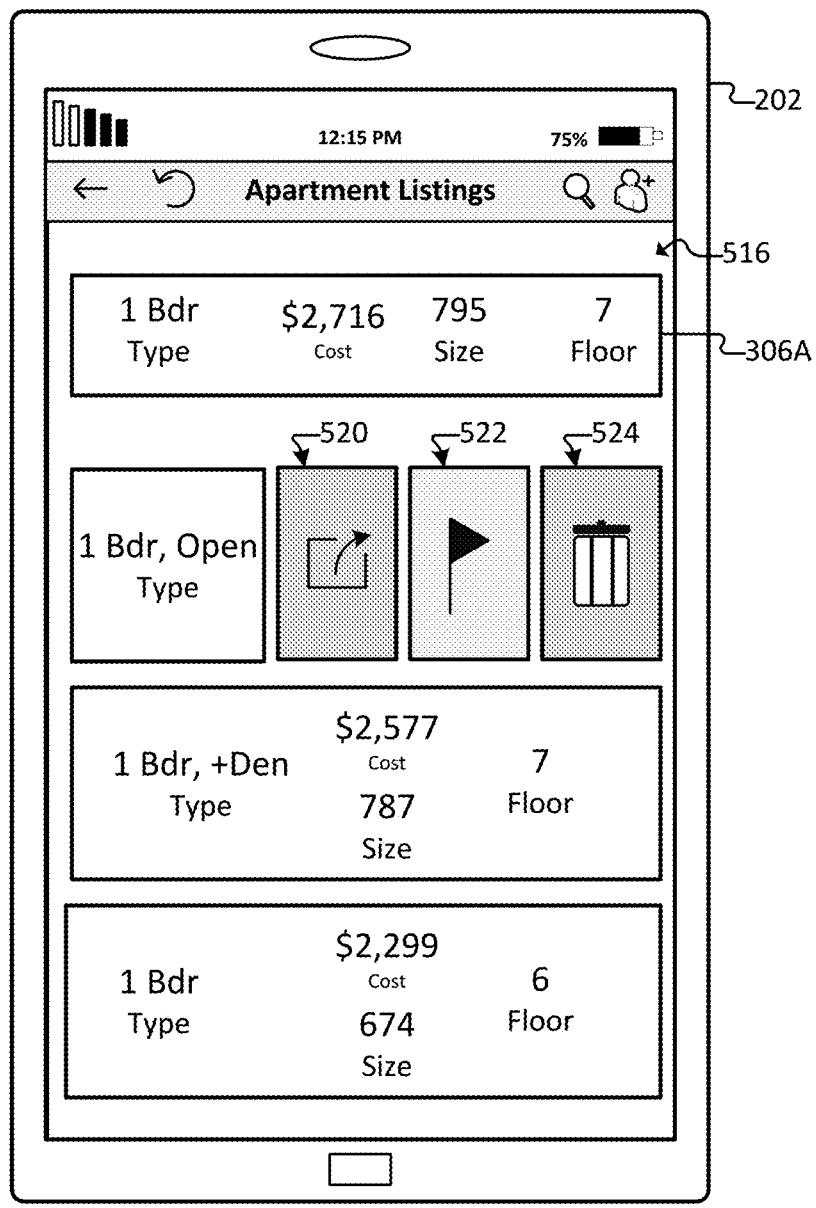
FIG. 5C illustrates additional commands that can be accessed from the deck view, according to an example embodiment.

FIG. 5C illustrates additional commands that can be accessed from the deck view 516, according to an example embodiment.

The deck view also provides enhanced swipe and command user capability. As shown, a user may, for example, swipe right or left on a particular row from the deck view 516 to display selectable commands in a swipe row interface. Such commands may include, but are not limited to: share, flag, delete, comment, remind me, add, reorder, etc. As described herein, the deck view displays one or more rows of the spreadsheet, wherein each row further displays information from, or information related to, one or more cells within that row. In this example, a swipe row interface 518 is displayed in response to, for example, a swipe left of the row. In this example, the swipe row interface 518 displays three commands that can be performed for that row: a share command 520, a flag command 522, and a delete command 524. Although three commands are displayed, these commands are merely exemplary. More, fewer, or different commands may alternatively be displayed.

In an example, the share command 520 allows the user to send (e.g., via email, text message, instant message, etc.) the particular row information. In some embodiments, selection of the share command 520 will share the entire row of data. Alternatively, in other embodiments selection of the share command 520 will share the information displayed in the deck view for that particular row. Alternatively, selection of the share command 520 will share information in that particular row and selected by the user.

In the example, the flag command 522 allows the user to flag that row. In some embodiments, selection of the flag command 522 will highlight the entire row. Alternatively, in other embodiments, selection of the flag command 522 will highlight information displayed in the deck view for that particular row. Alternatively, in other embodiments, selection of the flag command 522 will highlight information in that particular row and selected by the user. Alternatively or additionally, selection of the flag command 522 will place a flag on the row.

In some embodiments, selection of the delete command 524 will delete the entire row. Alternatively, in other embodiments, selection of the delete command 524 will delete only information displayed in the deck view for that particular row. Alternatively, in other embodiments, selection of the delete command 524 will delete information in that particular row and selected by the user.

Figure 5D:
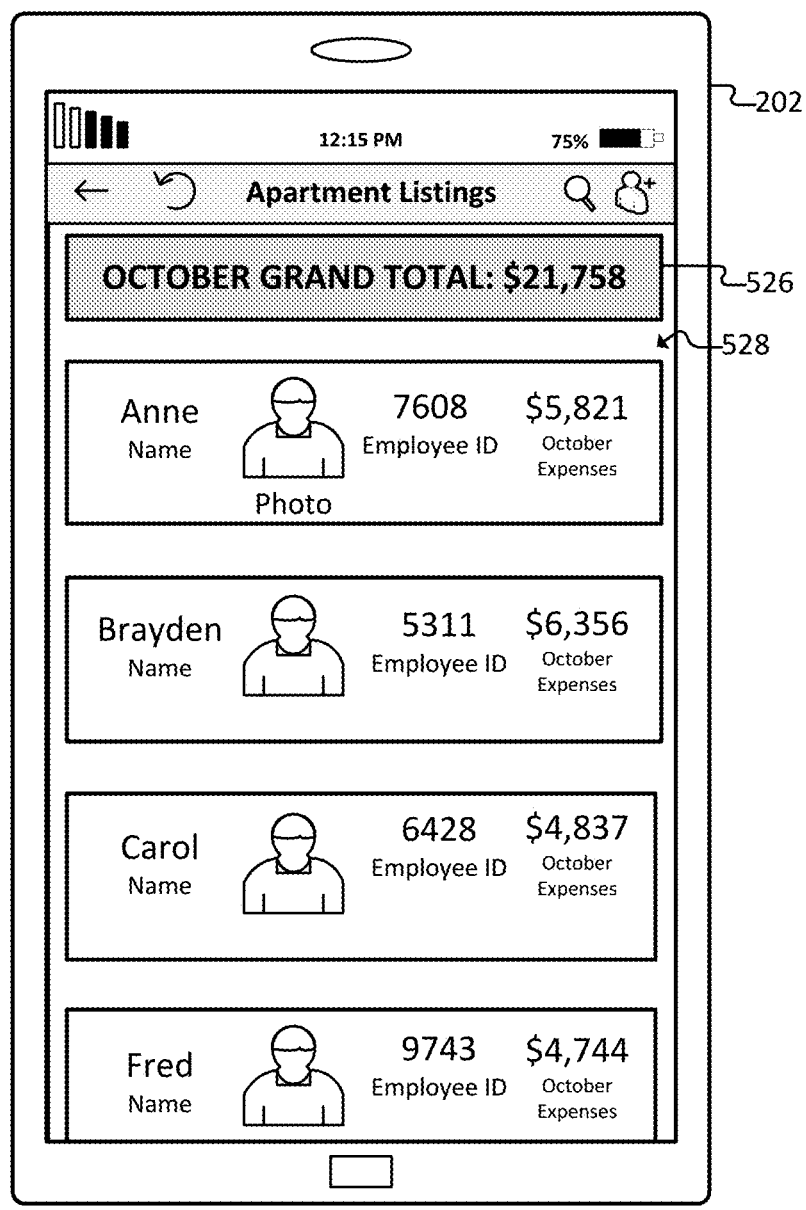
FIG. 5D illustrates the display of a grand total in the deck view, according to an example embodiment.

FIG. 5D illustrates the display of a grand total in the deck view, according to an example embodiment.

As described herein, the deck view displays one or more rows of the spreadsheet, wherein each row further displays information from, or information related to, one or more cells within that row. In some embodiments, the spreadsheet includes a summary row that summarizes the table. In one example embodiment, a grand total row including the grand total of one or more columns of the spreadsheet may be displayed. In other embodiments, a chart summarizing the data may be displayed. In such an example, the chart may be automatically generated or generated in response to a user's selection of an option to generate a summary chart. Charts may summarize the data over the table, sums, counts, averages, etc. for one or more columns, for example. In other embodiments, other summaries may also be displayed.

Accordingly, an example grand total display 526 is illustrated in FIG. 5D. In this example, the grand total display 526 displays the grand total (e.g., $21,758) of the October expenses of all the employees in the spreadsheet. The grand total display 526 allows users to easily see the grand total row that would otherwise only be displayed at the bottom of the deck view 528 as a separate row. In some embodiments, the grand total display 526 displays more than one grand total and also displays the corresponding column heading. Accordingly, the grand total display 526 allows the user to quickly see the end result data in the spreadsheet. Although the grand total display 526 is positioned at the top, above the other cads, this grand total display 526 could also hover in front of cards, and in some embodiments, it may hover while scrolling. Alternatively or additionally, the grand total display 526 may be positioned at the bottom of the display. Aspects of the present disclosure are not intended to be limited to the position of the grand total display and are instead intended to include all such display positions.

Furthermore, a dashboard may be displayed in the deck view, providing a summary view of the spreadsheet showing additional features such as, for example, charts or graphs of the data the user is currently viewing.

Figure 5E:
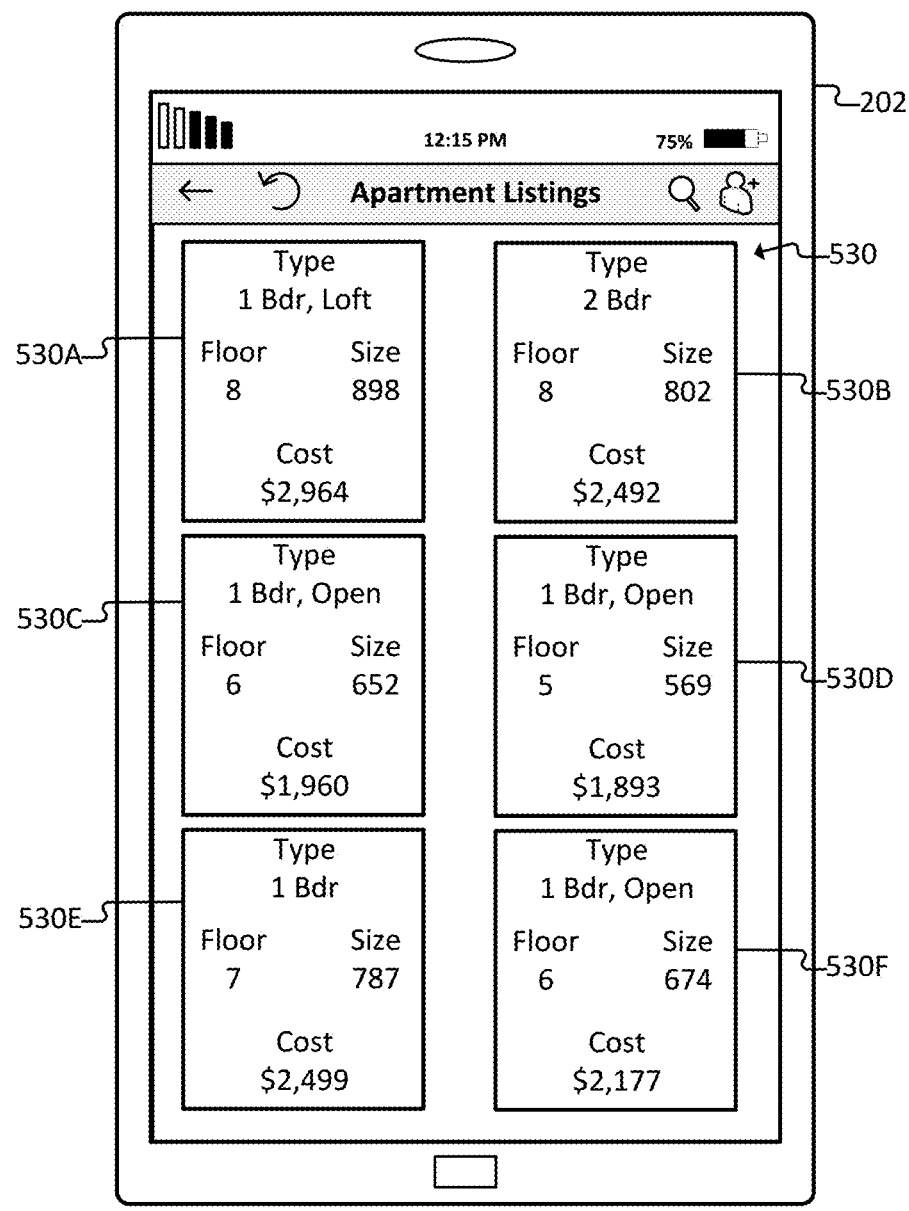
FIG. 5E illustrates a square deck view, according to an example embodiment.

FIG. 5E illustrates a square deck view 530, according to an example embodiment.

In this example, the square deck view 530 also displays multiple rows of the spreadsheet, but rather than displaying each row in a rectangular list format, the square deck view 530 displays each row as a square object (e.g., object 532A-532F). In some embodiments, a user can toggle between this square deck view 530 and the rectangular list deck view, as illustrated with reference to FIGS. 5A-5D. In some embodiments, each object 532, which represents a row of the spreadsheet, can be rearranged. In some embodiments, rearrangement of an object 532 may also rearrange the corresponding row within the underlying spreadsheet. In some embodiments, the square deck view has the same capabilities as the rectangular list deck view. The square deck view 530 provides a different way in which to visualize the data. Other formats are also disclosed, based on the shape of the data. For example, if strings used in the fields are short, or if the fields include numbers, squares or rectangles may be selected. Accordingly, the deck view may be arranged and represented in different ways based in part on user's preference, functionality of the data, visual appearance based on the type, size and length of the data, etc.

Figure 5F:
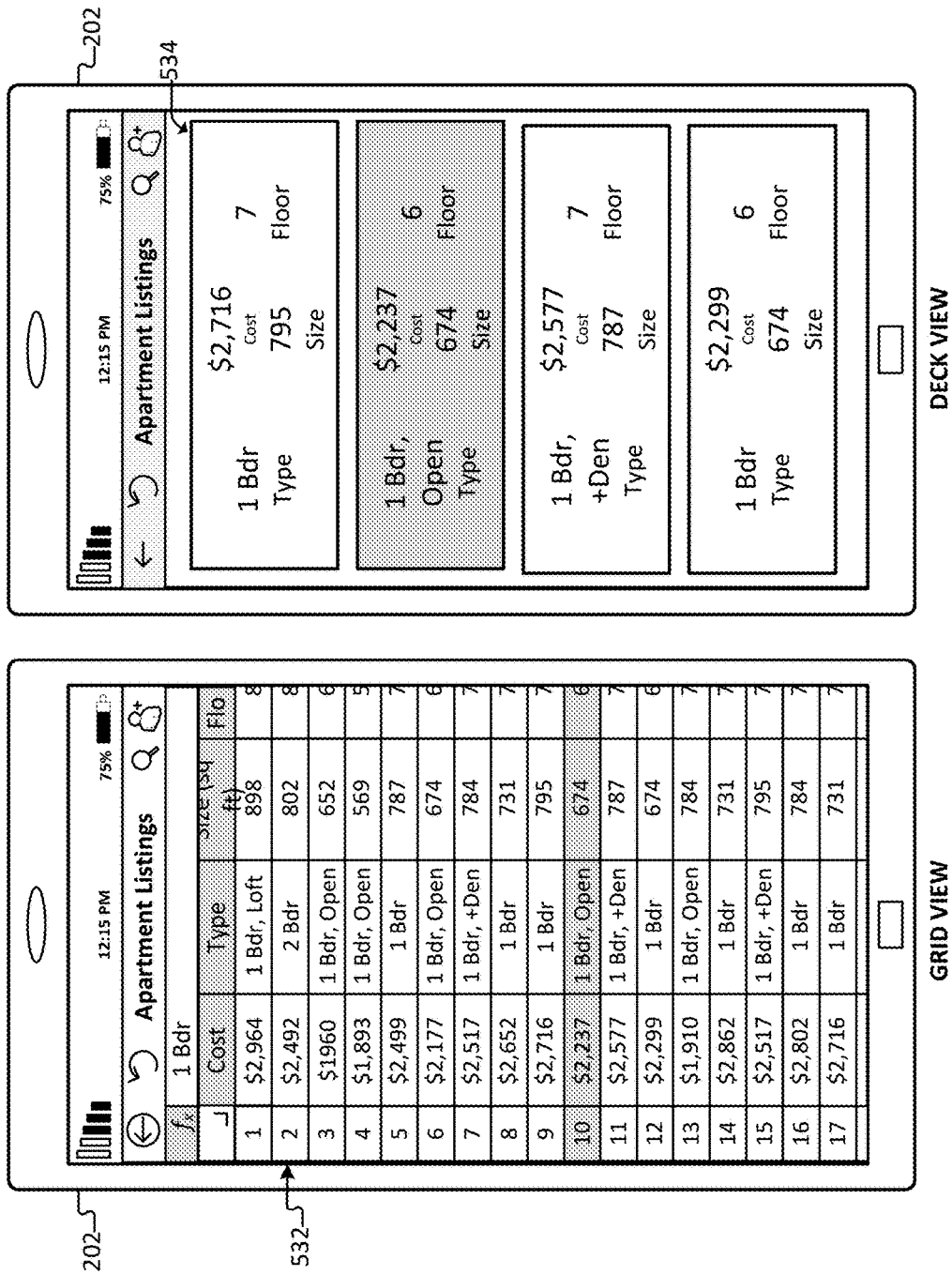
FIG. 5F illustrates the deck view surfacing formatting as applied to the underlying spreadsheet, according to an example embodiment.

FIG. 5F illustrates the deck view surfacing formatting as applied to the underlying spreadsheet, according to an example embodiment.

In an example, one or more rows of the spreadsheet may include formatting such as, for example, row highlighting/color fill, text color, cell highlighting/color fill, bolding, shading, border lines, etc. Aspects of the present disclosure provide implementing such formatting in the deck view. As illustrated in FIG. 5F, the underlying spreadsheet as illustrated from the grid view 532 displayed on a mobile device 202 is represented by the image on the left and the corresponding deck view 534 displayed on a mobile device 202 is represented by the image on the right. As illustrated in the grid view 532, row 10 is highlighted. Accordingly, row 10 represented in the deck view is correspondingly highlighted. Accordingly, in some embodiments, the deck view surfaces the same formatting as would be displayed in the underlying spreadsheet. Alternatively or additionally, the deck view my surface fewer than the same formatting displayed in the grid view or it may even show different formatting than the grid view.

Figure 5G:
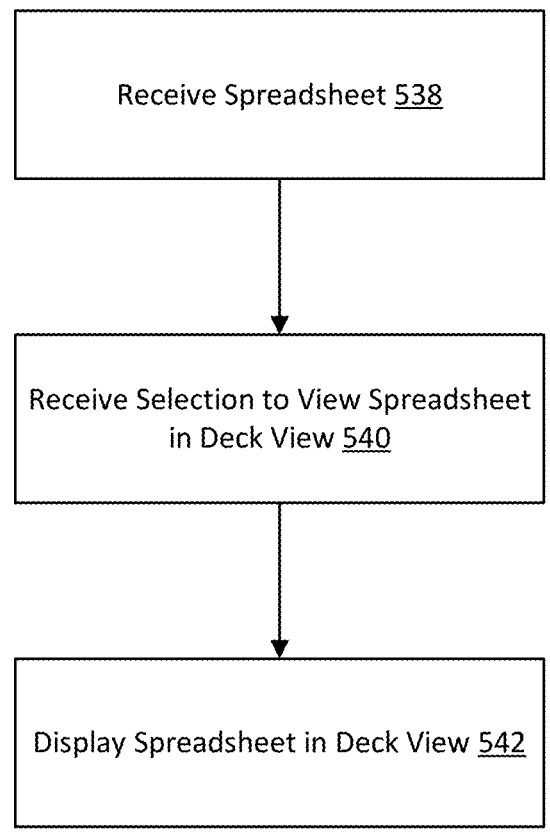
FIG. 5G illustrates a method for displaying, on a mobile device, a spreadsheet from the deck view, according to an example embodiment.

FIG. 5G illustrates a method 536 for displaying, on a mobile device, a spreadsheet from the deck view, according to an example embodiment.

The method 536 begins with the receive spreadsheet operation 538 where a spreadsheet application executing on a mobile device (e.g., mobile device 202) receives a spreadsheet. In an embodiment, the user may open a spreadsheet from the mobile device. In some embodiments, the spreadsheet may open in a grid view (e.g., grid view 200 of FIG. 2) and in other embodiments the spreadsheet may open in a card view (e.g., card view 402 of FIG. 4).

At the view spreadsheet in deck view operation 540, the spreadsheet application receives a selection to view the spreadsheet in the deck view. As described herein, the deck view displays one or more rows (or columns) of the spreadsheet, wherein each row (or column) further displays information from, or information related to, one or more cells within that row (or column). In one implementation from within the grid view, the user is presented a selectable option to view the spreadsheet in the deck view, and upon selection of that option, the spreadsheet application reorganizes the data stored therein to display the spreadsheet in the deck view. Alternatively or additionally, the deck view may be set as the default view when a spreadsheet is opened on a mobile device. Alternatively or additionally, selection of one or more rows (or columns) may cause the mobile device to display the spreadsheet in the deck view.

Alternatively or additionally, a selection to generate the deck view may be received from one or more tables, pivot tables, ranges in the grid view, sparsely populated ranges that are roughly rectangular, etc.

At the display spreadsheet in deck view operation 542, the spreadsheet application displays, on the mobile device, the spreadsheet from the deck view. In embodiments, the spreadsheet application rearranges the data stored in the spreadsheet. In some embodiments, a default deck view is set as a display of the first few columns of the spreadsheet, and in other embodiments, other default settings may be used. Alternatively, aspects of the present disclosure provide for a scan of the spreadsheet and the use of analytics to identify the most relevant data contained in the spreadsheet to display in the deck view. Alternatively or additionally, the user may define which columns or rows to display in the deck view.

Figure 5H:
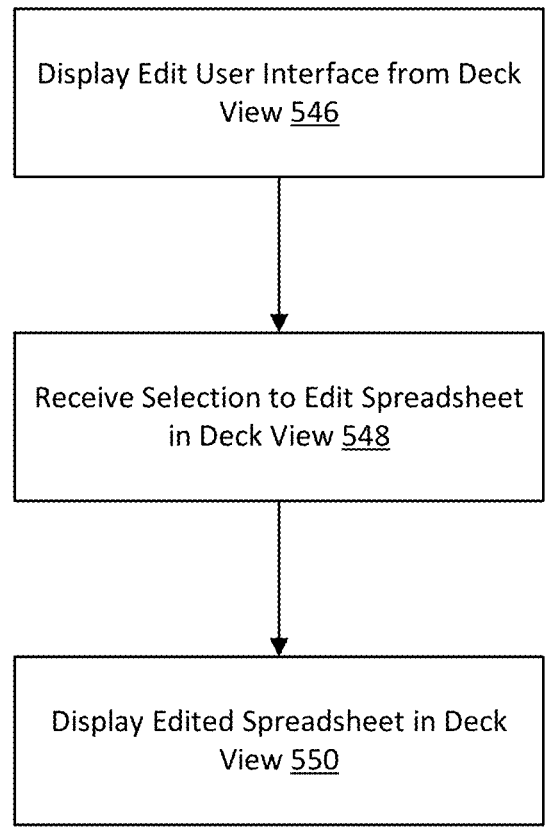
FIG. 5H illustrates a method for editing, on a mobile device, a spreadsheet from the deck view, according to an example embodiment.

FIG. 5H illustrates a method 544 for editing, on a mobile device, a spreadsheet from the deck view, according to an example embodiment.

The method 544 begins at the display edit user interface operation 546, where a spreadsheet application executing on a mobile device (e.g. mobile device 202) executes and displays an edit user interface (e.g., edit user interface 504 of FIG. 5A) within the deck view. As described herein, the deck view displays one or more rows (or columns) of the spreadsheet, wherein each row (or column) further displays information from, or information related to, one or more cells within that row (or column). As described herein, information stored in cells of the spreadsheet, and viewed from the deck view, can be edited from the edit user interface. In some embodiments, the edit user interface may be viewed by selection of, for example, option to edit the spreadsheet displayed from the deck view on the mobile device. In some embodiments, the edit user interface includes an add column option and cell editing options. Selection of the add column option, for example, allows the addition of one or more columns to the entire spreadsheet or to a particular row. Adding a column, in turn, adds an additional cell to each row of the spreadsheet or to an individual row. In some embodiments, the add column option also allows the user to add information to the cell created by addition of the new column. Any new columns (and hence cells) created by the add column option is also applied to the underlying spreadsheet. In embodiments, the cell editing options allow editing of one or more cells or one or more rows of the spreadsheet (e.g., editing the font and format of one or more cells as well as insert objects (e.g., objects, pictures, graphs, tables, charts, etc.) and borders/shading.

At the receive selection to edit the spreadsheet in the deck view operation 548, the spreadsheet application receives a selection to edit the spreadsheet from the deck view. As described herein, the spreadsheet application may receive an option to add a column, delete a column, edit information stored in one or more cells including, but not limited to editing the actual data; font; formatting; borders/shading; inserting objects; tables, graphs, charts, pictures, etc.; or edit one or more rows of the spreadsheet.

At the display edited spreadsheet in deck view operation 550, the spreadsheet application displays the edited spreadsheet from the deck view on the mobile device based on the one or more edits received in operation 548.

Figure 5I:
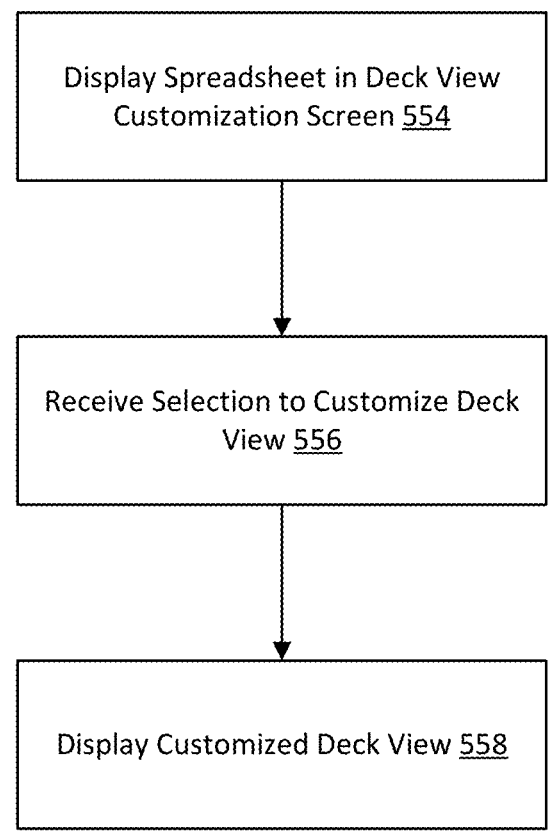
FIG. 5I illustrates a method for customizing the deck view, according to an example embodiment.

FIG. 5I illustrates a method 552 for customizing the deck view, according to an example embodiment.

The method 552 beings at the display spreadsheet from the deck view customization screen operation 554. In embodiments, the arrangement of the information displayed in the deck view may be edited from a deck view customization screen (e.g., deck view customization screen 510 of FIG. 5B). Additionally or alternatively, information may be hidden from the deck view or additional information may be added to the deck view. Furthermore, information may be resized as it is displayed in the deck view. These operations may be performed from the example deck view customization screen.

At the receive selection to customize the deck view operation 556, the spreadsheet application receives a selection to customize the deck view. In particular, the spreadsheet application may receive, from the deck view customization screen a selection of information stored in the spreadsheet and to be displayed in the deck view, a selection to hide one information in the deck view, a selection to move information in the deck view, and a selection to resize information in the deck view.

At the display customized deck view operation 558, the spreadsheet application displays the spreadsheet in the customized deck view, based on the one or more selections received from operation 556.

Figure 6A:
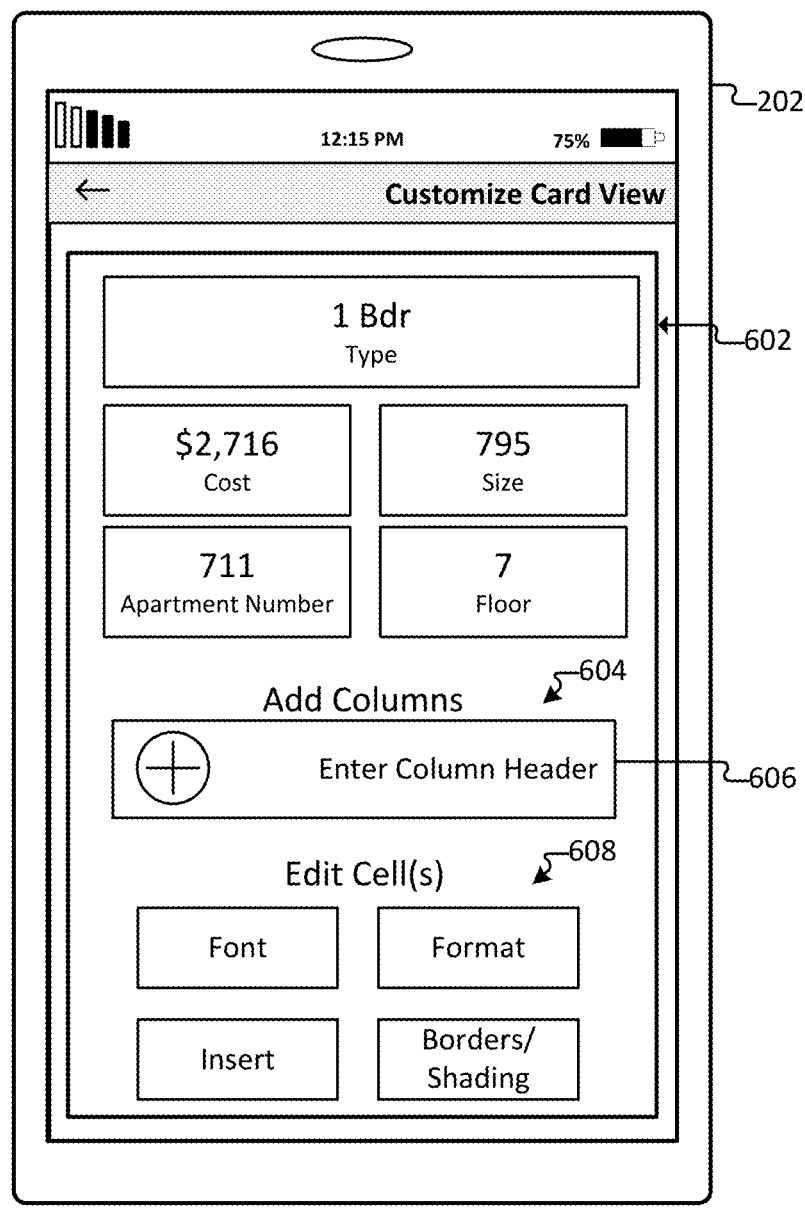
FIG. 6A illustrates editing a spreadsheet from the card view as displayed on a mobile device 202, according to an example embodiment.

FIG. 6A illustrates editing a spreadsheet from the card view 602 as displayed on a mobile device 202, according to an example embodiment.

As described herein, the card view displays a single row of the spreadsheet, and further display information from, or information related to, one or more cells within that row. As described herein, information stored in the spreadsheet can be edited and information can be added to the spreadsheet, from the various views, including from the card view. In this example, the mobile device 202 displays the card view 602 of a spreadsheet, wherein the card view 602 includes an edit user interface 604. In some embodiments, the edit user interface 604 may be viewed by selection of, for example, an option to edit the spreadsheet displayed on the mobile device 202. In this example, the edit user interface 604 further includes an add column option 606 and cell editing options 608. The add column option 606, for example, allows the addition of one or more columns to the entire spreadsheet or to the particular row displayed in the card view 602. Adding a column, in turn, adds an additional cell to the row displayed in the card view 602. Alternatively or additionally, adding a column adds an additional cell to each row of the spreadsheet. In embodiments, the add column option 606 allows the addition of a single column to one or more rows. Alternatively or additionally, the add column option 606 allows the addition of multiple columns to one or more rows. Alternatively or additionally, the add column option 606 further allows the user to specify the column header associated with the new column. In some embodiments, the add column option 606 also allows the user to add information to the cell created by addition of the new column. Any new columns (and hence cells) created by the add column option 606 is also applied to the underlying spreadsheet.

The cell editing options 608 allow editing of one or more cells of the row displayed in the card view 602. In the example illustrated, the cell editing options 608 allows the user to edit the font and format of one or more cells as well as insert objects (e.g., objects, pictures, graphs, tables, charts, etc.) and borders/shading. In some embodiments, editing may be performed by selecting, from information displayed in the card view 602, one or more cells, which would edit the selected cells. Any edits performed using the cell editing options 608 is also applied to the underlying spreadsheet. Although editing options such as font, format, borders/shading, and insert are illustrated, it is understood that these editing features are exemplary only and are not intended to limit the scope of the present disclosure.

Figure 6B:
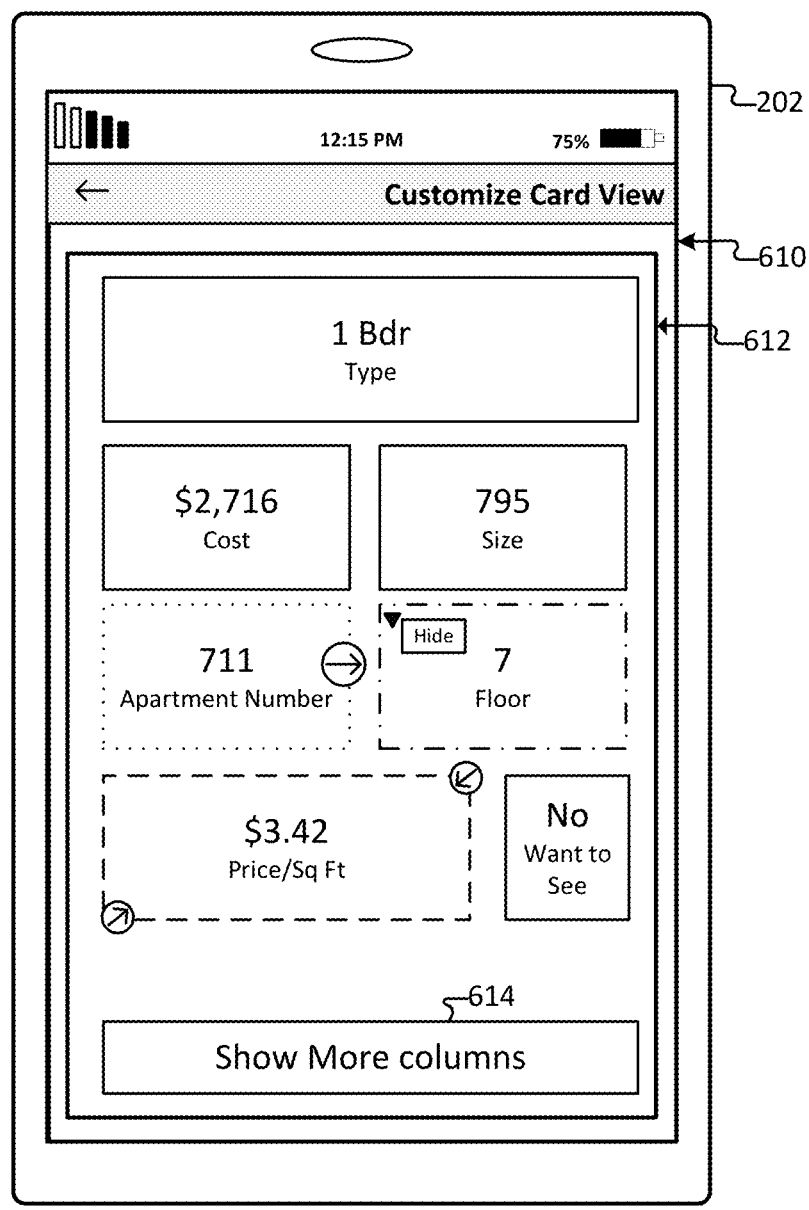
FIG. 6B illustrates a card view customization screen, according to an example embodiment.

FIG. 6B illustrates a card view customization screen 610, according to an example embodiment.

As described herein, the card view displays a single row of the spreadsheet, and includes information from, or information related to, one or more cells within that row. Similar to the deck view shown in FIG. 5B, the arrangement of the information displayed in the card view may also be edited. Additionally or alternatively, information may be hidden from the card view or additional information may be added to the card view. Furthermore, information may be resized. In the example illustrated in FIG. 6A, a card view customization screen 610 is displayed on the mobile device 202. In this example, the card view customization screen 610 displays the card view 612 and the show more columns option 614.

The example card view customization screen 610 provides the user with the flexibility to choose the fields they want to see in the card view and the arrangement. In some embodiments, a default card view is set, such as, for example, a display of the first five columns of the spreadsheet, however, in other embodiments, other default settings may be used. Alternatively, aspects of the present disclosure provide for a scan of the spreadsheet and the use of analytics to identify the most relevant data contained in the spreadsheet to display in the card view. Alternatively or additionally, the user may define which columns or rows to display in the card view.

In this example, the card view 612 within the card view customization screen 610 displays a single row (e.g., row object 306A representing row 9 of the spreadsheet) of the spreadsheet, wherein the row further displays information from, and information related to, seven cells within that row. As described herein, information displayed in the card view may be rearranged, resized, hidden, and added. In this embodiment, the "$3.42" cell information that corresponds to the column heading "Price/Sq Ft" may be resized. In some embodiments, the information may be resized by selecting a resize option or selecting the information from the touch sensitive display and pinching to enlarge or reduce the size of the information. In some embodiments, selecting the information may automatically and temporarily outline the information as the information is being resized, as indicated by the dashed line, so as to inform the user of the resize. In some embodiments, such change in size may also automatically change the information font.

Additionally or alternatively, the card view may also show a summary of the data in the spreadsheet. For example, the card view may summarize a particular range of data in the card view so that the user can maintain a high-level understanding despite seeing a single row in the card view. Furthermore, a single field may be summarized and that summary may be displayed from the card view. For example, the single field summary may indicate how the value of that field relates to other values in that row or column (depending on the organization of the spreadsheet). In an example, the $3.42/sq ft may have a different format (e.g., highlight, bolding, an icon, an image, etc.) to indicate that it is the highest price or lowest price in that column of price/sq ft values. Moreover, such visualizations may be displayed in numerous ways, such as, for example, a data bar, a spark line, a speedometer icon, a font size larger or smaller from other values, etc.

Also shown in this example is the "711" cell information corresponding to the column heading "Apartment Number" that may be moved to another area within the card view 612. In some embodiments, the information may be moved by selecting a move option or by selecting the information from the touch sensitive display and moving the information to the desired position within the card view 612. In some embodiments, selecting the information to be moved may automatically and temporarily outline the information as the information is being moved, as indicated by the dotted line, so as to inform the user of the move.

Also shown in this example is the "7" cell information corresponding to the column heading "Floor" that may be hidden from the card view 612. In some embodiments, the information may be hidden by selecting a hide option from a menu. In other embodiments, information may be hidden by selecting the information from the touch sensitive display and dragging the information from the row of the card view 612. In some embodiments, selecting the information to be hidden may automatically and temporarily outline the information, as indicated by the dotted-dashed line, so as to inform the user that the selected information is to be hidden.

In this example, the card view customization screen 610 further includes a show more columns option 614 in which additional information may be added to the card view 612. In particular, additional columns from the spreadsheet that are not shown in the card view 612 may be added. Based on a selection of one or more columns from the show more columns option 614, the associated cell information may be displayed for the row displayed in the card view 612.

In some embodiments, the information arranged or reorganized in the card view may be independent from, and might not affect the information displayed (and the associated arrangement) in the deck view. Alternatively, the changes to the organization of the card view may affect the deck view.

Figure 6C:
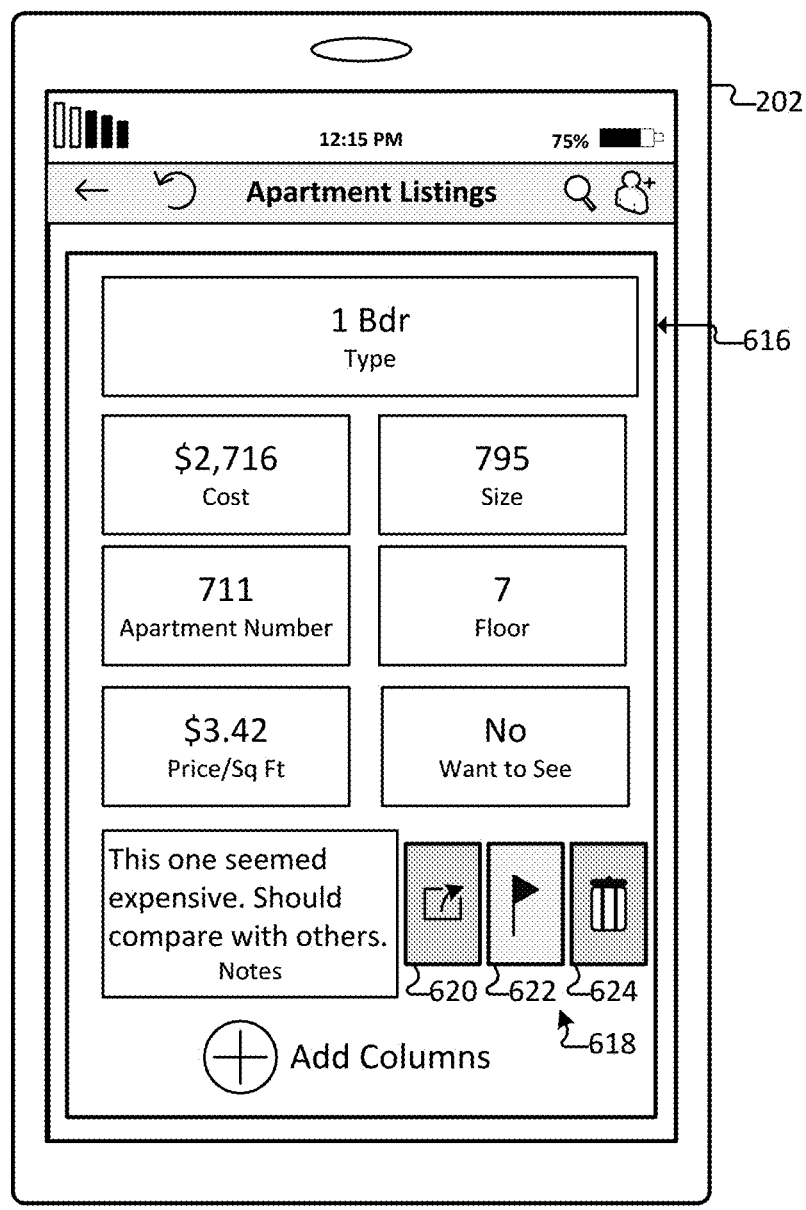
FIG. 6C illustrates additional commands that can be accessed from the card view 616, according to an example embodiment.

FIG. 6C illustrates additional commands that can be accessed from the card view 616, according to an example embodiment.

The card view also provides enhanced swipe and command user capability. As shown, a user may, for example, swipe right or left on a particular row from the card view to display selectable commands in a swipe row interface. Such commands may include, but are not limited to: share, flag, delete, comment, remind me, add, reorder, etc. As described herein, the card view displays a single row of the spreadsheet, and includes information from, or information related to, one or more cells within that row. In this example, a swipe row interface 618 is displayed in response to, for example, a swipe left of information from a cell within the row displayed in the card view. In this example, the swipe row interface 618 displays three commands that can be performed for that row: a share command 620, a flag command 622, and a delete command 624. Although three commands are displayed, these commands are merely exemplary. More, fewer, or different commands may alternatively be displayed.

In an example, the share command 620 allows the user to send (e.g., via email, text message, instant message, etc.) the particular cell information. In the example, the flag command 622 allows the user to flag that particular cell information. In some embodiments, selection of the flag command 622 will highlight the cell information. Alternatively or additionally, selection of the flag command 622 will place a flag in the cell. In some embodiments, selection of the delete command 624 will delete the cell.

Figure 6D:
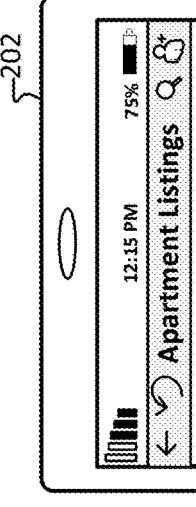
FIG. 6D illustrates the swipe functionality from the card view, according to an example embodiment.

FIG. 6D illustrates the swipe functionality from the card view, according to an example embodiment.

As described herein, the card view displays a single row of the spreadsheet, and includes information from, or information related to, one or more cells within that row. Aspects of the present disclosure further include swipe functionality from the card view. Swipe functionality allows the user to, using the touch sensitive display, swipe the screen left or right to view different rows of the spreadsheet, as viewed from the card view. In the example shown in FIG. 6D, three images are illustrated, each image representing a mobile device 202 displaying a different row from the card view. The leftmost card view 626 displays row 8, the middle card view 628 display row 9, and the rightmost card view 630 displays row 10. In this example, a swipe to the right (indicated by the right facing arrow) would display the row above the currently displayed row. Accordingly, if the middle card view 628 is displayed, a swipe to the right, in this example, would cause the mobile device to display the leftmost card view 626 (e.g., row 8). Furthermore, in this example, a swipe to the left (indicated by the left facing arrow) would display the row below the currently displayed row. Accordingly, if the middle card view 628 is displayed, a swipe to the left, in this example, would cause the mobile device to display the rightmost card view 630 (e.g., row 10). Accordingly, aspects of the present disclosure provide the ability to quickly view individual rows of the spreadsheet without requiring the user to return to the deck or grid views.

Figure 6E:
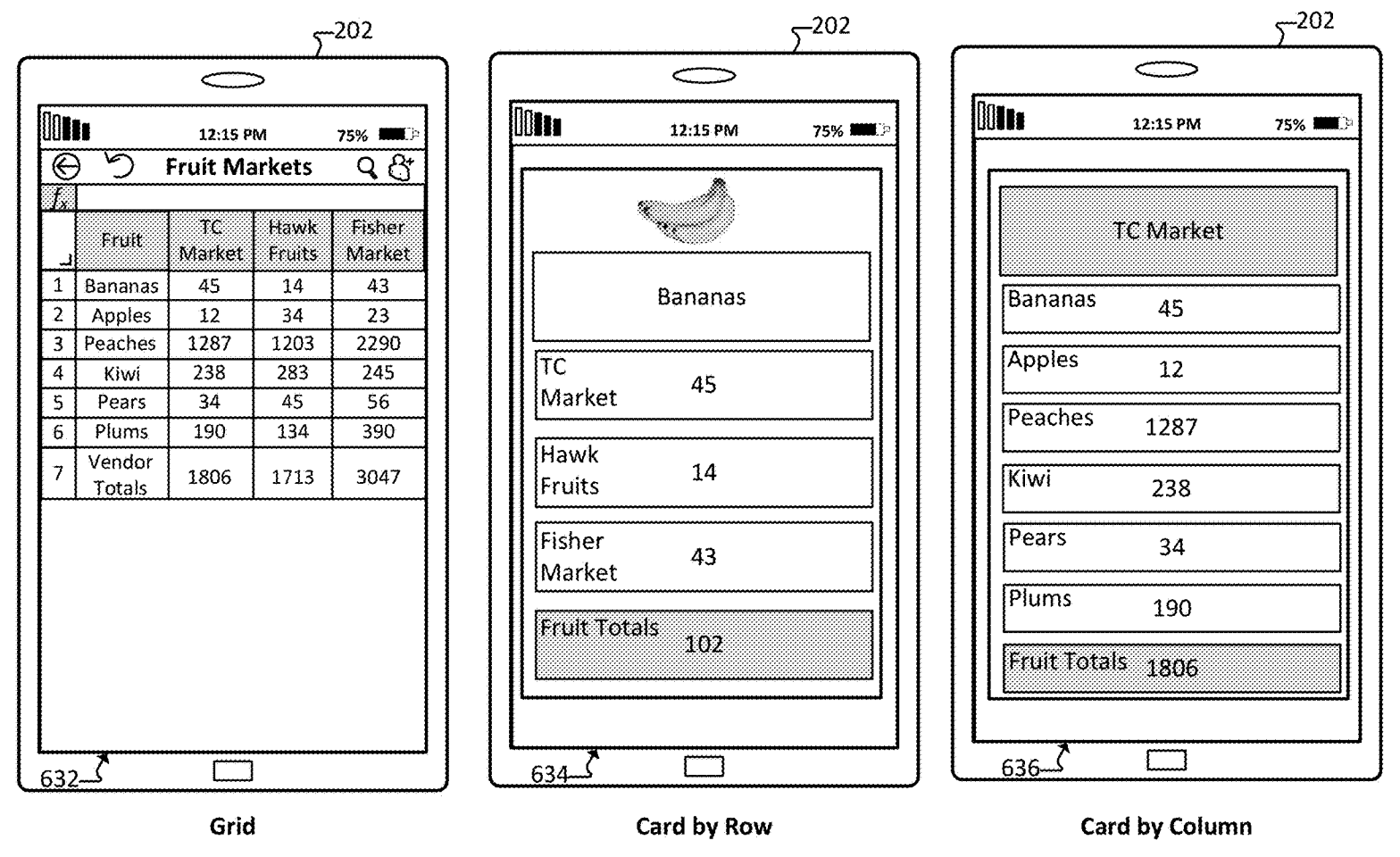

FIG. 6E illustrates switching between column card view and row card view, according to an example embodiment.

In the example illustrated in FIG. 6E, the underlying spreadsheet illustrated from the grid view 632 displayed on a mobile device 202 is represented by the leftmost image, the corresponding row card view 634 displayed on the mobile device 202 is represented by the image in the middle, and the corresponding column card view 636 displayed on the mobile device 202 is represented by the rightmost image. The row card view 634 displays a single row of the spreadsheet, and includes information from, or information related to, one or more cells within that row. The column card view 636 displays a single column of the spreadsheet, and includes information from, or information related to, one or more cells within that column.

Aspects of the present disclosure provide the ability to switch between card views, and specifically between a column card view and a row card view. In this example, the grid view 632 illustrates a spreadsheet storing information relating to fruit vendors and various fruits those vendors offer. The example row card view 634 displays cell information from row 1 (e.g., bananas) and corresponding column header information (e.g., "TC Market," "Hawk Fruits," and "Fisher Market"). By contrast, the example column card view 636 displays cell information from column 1 (e.g., TC Market) and corresponding row header information (e.g., "Bananas," "Apples," "Peaches," "Kiwi," "Pears," and "Plums"). Accordingly, based on the orientation of the spreadsheet and the information desired, the user may switch between the row card view 634 and the column card view 636. In some embodiments, switching between views can be performed by, for example, selection of a switch view option, selection of a row, or selection of a column. In other embodiments, other methods may be used to switch between views.

Figure 6F:
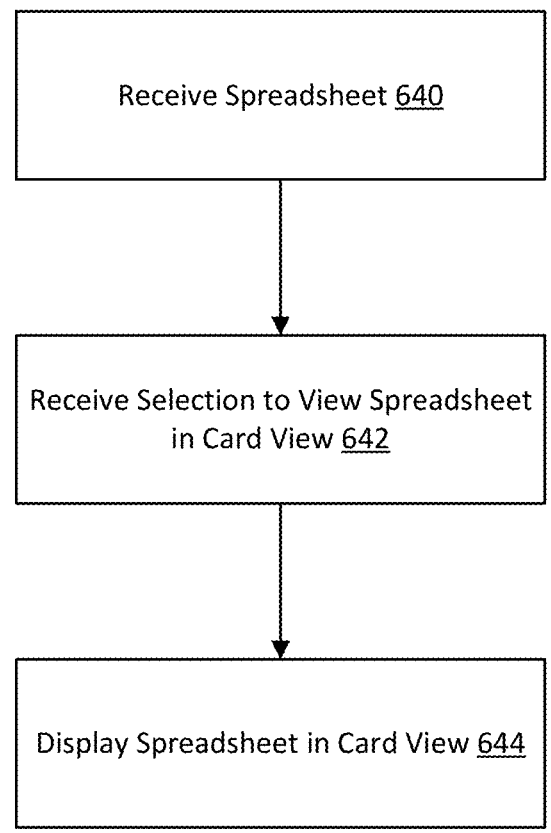
FIG. 6F illustrates a method for displaying, on a mobile device, a spreadsheet from the card view, according to an example embodiment.

FIG. 6F illustrates a method 638 for displaying, on a mobile device, a spreadsheet from the card view, according to an example embodiment.

The method 638 begins with the receive spreadsheet operation 640 where a spreadsheet application executing on a mobile device (e.g., mobile device 202) receives a spreadsheet. In an embodiment, the user may open a spreadsheet from the mobile device. In some embodiments, the spreadsheet may open in a grid view (e.g., grid view 200 of FIG. 2) and in other embodiments the spreadsheet may open in a deck view (e.g., card view 302 of FIG. 3).

At the view spreadsheet in card view operation 642, the spreadsheet application receives a selection to view the spreadsheet in the card view. As described herein, the card view displays a single row (or column) of the spreadsheet, and further displays information from, or information related to, one or more cells within that row (or column). In one implementation from within the grid view, the user is presented a selectable option to view the spreadsheet in the card view, and upon selection of that option, the spreadsheet application reorganizes the data stored therein to display the spreadsheet in the card view. Alternatively or additionally, the card view may be set as the default view when a spreadsheet is opened on a mobile device. Alternatively or additionally, selection of a row (or column) may cause the mobile device to display the spreadsheet in the card view.

Alternatively or additionally, a selection to generate the card view may be received from one or more tables, pivot tables, ranges in the grid view, sparsely populated ranges that are roughly rectangular, etc.

At the display spreadsheet in card view operation 644, the spreadsheet application displays, on the mobile device, the spreadsheet from the card view. In embodiments, the spreadsheet application rearranges the data stored in the spreadsheet. In some embodiments, a default card view is set as a display of the first few columns of a particular row of the spreadsheet, and in other embodiments, other default settings may be used. Alternatively, aspects of the present disclosure provide for a scan of the spreadsheet and the use of analytics to identify the most relevant data contained in the spreadsheet to display in the card view. Alternatively or additionally, the user may define which columns (or rows) to display for the particular row (or column) in the card view.

Figure 6G:
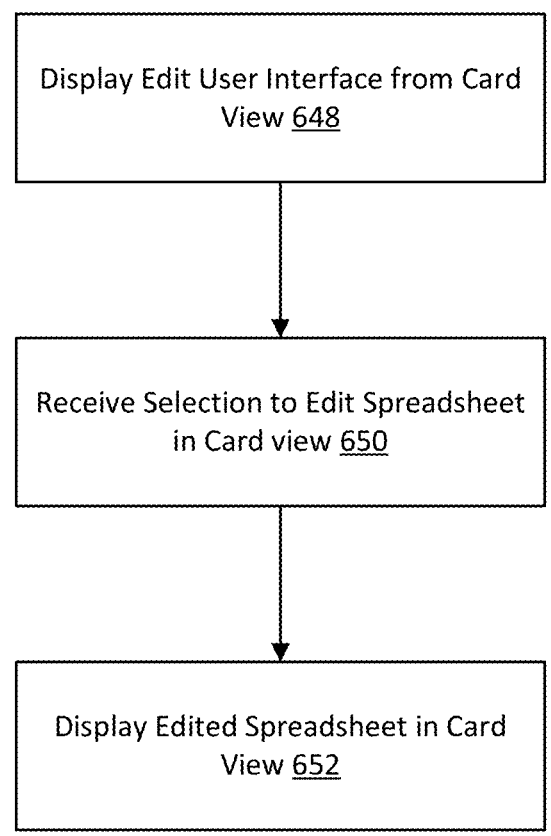
FIG. 6G illustrates a method for editing, on a mobile device, a spreadsheet from the card view, according to an example embodiment.

FIG. 6G illustrates a method 646 for editing, on a mobile device, a spreadsheet from the card view, according to an example embodiment.

The method 646 begins at the display edit user interface operation 648, where a spreadsheet application executing on a mobile device (e.g. mobile device 202) executes and displays an edit user interface (e.g., edit user interface 604 of FIG. 6A) within the card view. As described herein, the card view displays a single row (or column) of the spreadsheet, and further displays information from, or information related to, one or more cells within that row (or column). As described herein, information stored in cells of the spreadsheet, and viewed from the card view, can be edited from the edit user interface. In some embodiments, the edit user interface may be viewed by selection of, for example, option to edit the spreadsheet displayed from the card view on the mobile device. In some embodiments, the edit user interface includes an add column option and cell editing options. Selection of the add column option, for example, allows the addition of one or more columns to the entire spreadsheet or to the particular row displayed in the card view. Adding a column, in turn, adds an additional cell to each row of the spreadsheet or to the displayed row. In some embodiments, the add column option also allows the user to add information to the cell created by addition of the new column. Any new columns (and hence cells) created by the add column option is also applied to the underlying spreadsheet. In embodiments, the cell editing options allow editing of one or more cells or one or more rows of the spreadsheet (e.g., editing the font and format of one or more cells as well as insert objects (e.g., objects, pictures, graphs, tables, charts, etc.) and borders/shading.

At the receive selection to edit the spreadsheet in the card view operation 650, the spreadsheet application receives a selection to edit the spreadsheet from the card view. As described herein, the spreadsheet application may receive an option to add a column, delete a column, edit information stored in one or more cells including, but not limited to editing the actual data; font; formatting; borders/shading; inserting objects; tables, graphs, charts, pictures, etc.

At the display edited spreadsheet in card view operation 652, the spreadsheet application displays the edited spreadsheet from the card view on the mobile device based on the one or more edits received in operation 650.

Figure 6H:
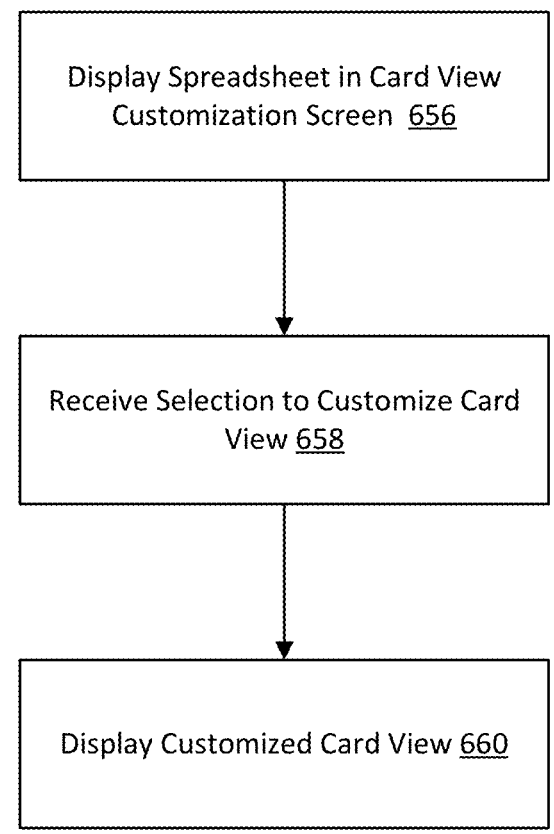
FIG. 6H illustrates a method for customizing the card view, according to an example embodiment.

FIG. 6H illustrates a method 654 for customizing the card view, according to an example embodiment.

The method 654 beings at the display spreadsheet from the card view customization screen operation 656. As described herein, the card view displays a single row (or column) of the spreadsheet, and further displays information from, or information related to, one or more cells within that row (or column). In embodiments, the arrangement of the information displayed in the card view may be edited from a card view customization screen (e.g., card view customization screen 610 of FIG. 6B). Additionally or alternatively, information may be hidden from the card view or additional information may be added to the card view, such as one or more cells corresponding to a column not displayed in the card view. Furthermore, information may be resized as it is displayed in the card view. These operations may be performed from the example card view customization screen.

At the receive selection to customize the card view operation 658, the spreadsheet application receives a selection to customize the card view. In particular, the spreadsheet application may receive, from the card view customization screen a selection of information stored in the spreadsheet and to be displayed in the card view, a selection to hide one information in the card view, a selection to move information in the card view, and a selection to resize information in the card view.

At the display customized card view operation 660, the spreadsheet application displays the spreadsheet in the customized card view, based on the one or more selections received from operation 658.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, as described herein.

Figure 7:
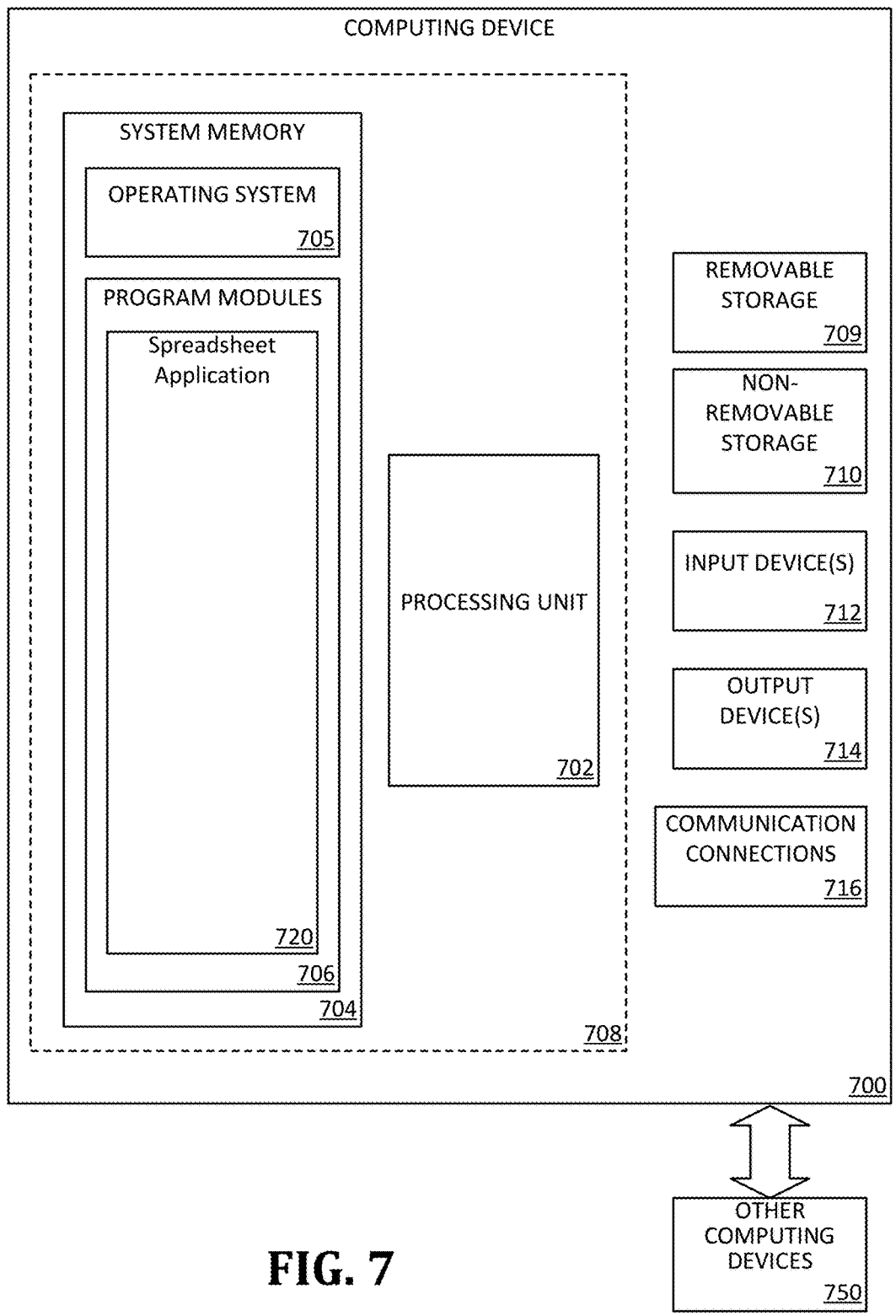
FIG. 7 is a block diagram illustrating physical components (e.g., hardware) of a computing device with which aspects of the disclosure may be practiced.

FIG. 7 is a block diagram illustrating physical components (e.g., hardware) of a computing device 700 with which aspects of the disclosure may be practiced.

The computing device components described below may have computer executable instructions for implementing a spreadsheet application 720 on a computing device (e.g., server computing device 108 and/or client computing device 104), including computer executable instructions for spreadsheet application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running spreadsheet application 720.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710. As stated above, a number of program modules and data files may be stored in the system memory 704. While executing on the processing unit 702, the program modules 706 (e.g., spreadsheet application 720) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
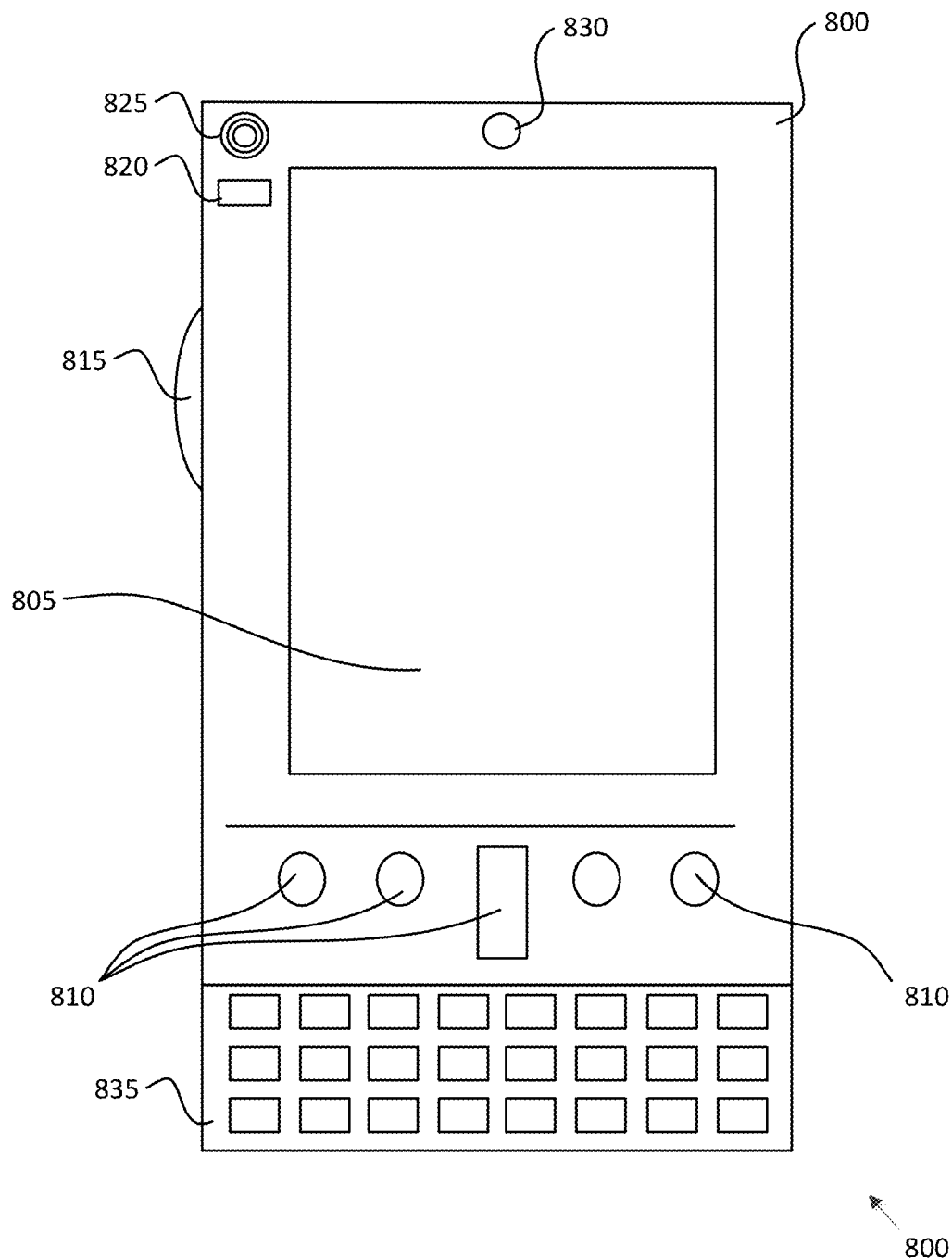
FIG. 8A and FIG. 8B illustrate a mobile computing device, for example, a mobile telephone, a smart phone, wearable computer (such as a smart watch), a tablet computer, a laptop computer, and the like, with which embodiments of the disclosure may be practiced.
Figure 8B:
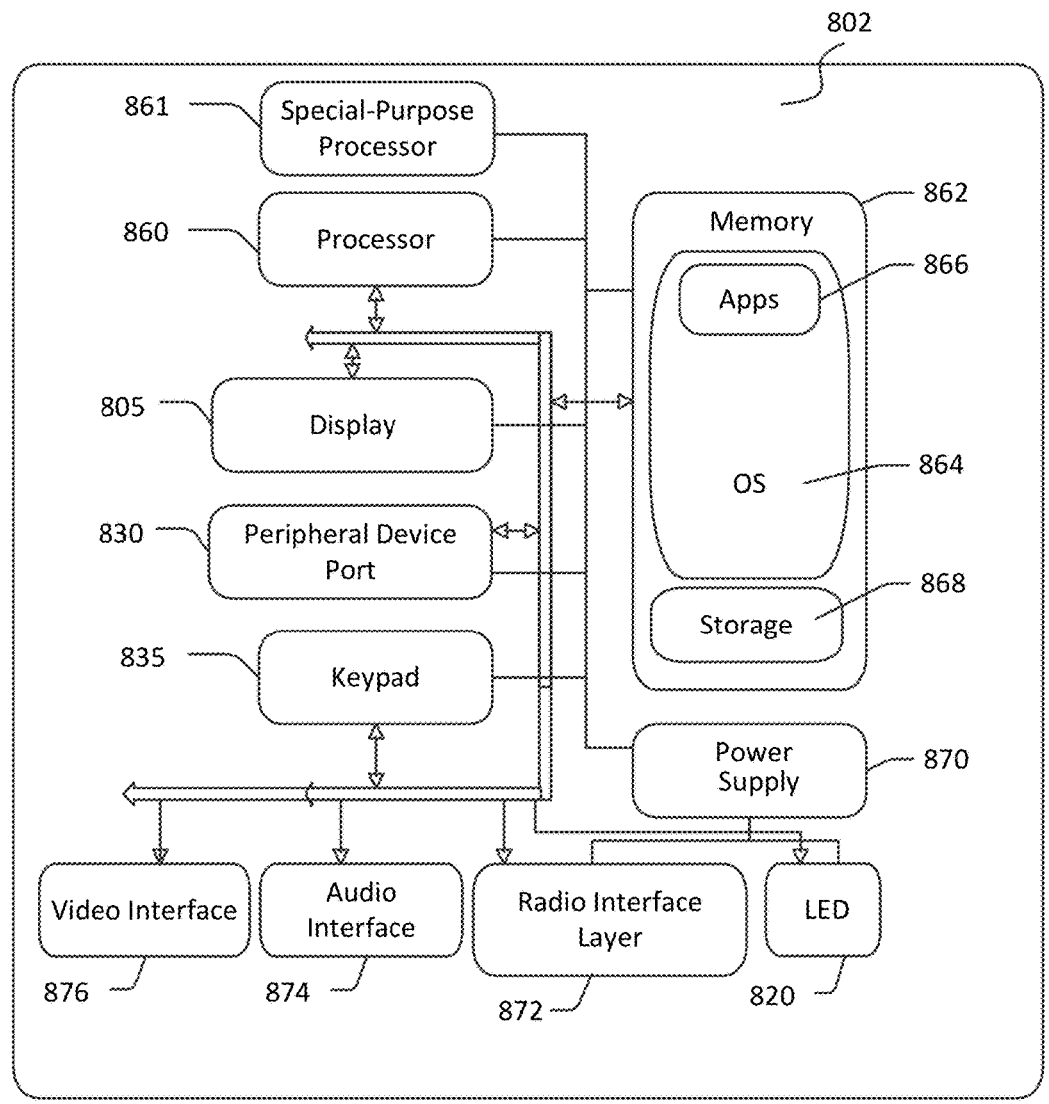

FIG. 8A and FIG. 8B illustrate a mobile computing device 800, for example, a mobile telephone, a smart phone, wearable computer (such as a smart watch), a tablet computer, a laptop computer, and the like, with which embodiments of the disclosure may be practiced.

In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for associating one or more images with one or more cells of a spreadsheet as described herein (e.g., field component, associate component, array component, hybrid component, operation component, and/or UX component, etc.).

The system 802 has a power supply 870, which may be implemented as one or more batteries. The power supply 870 may further include an external power source, such as an AC adapter or a powered docking cradle that supplements or recharges the batteries. The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

Figure 9:
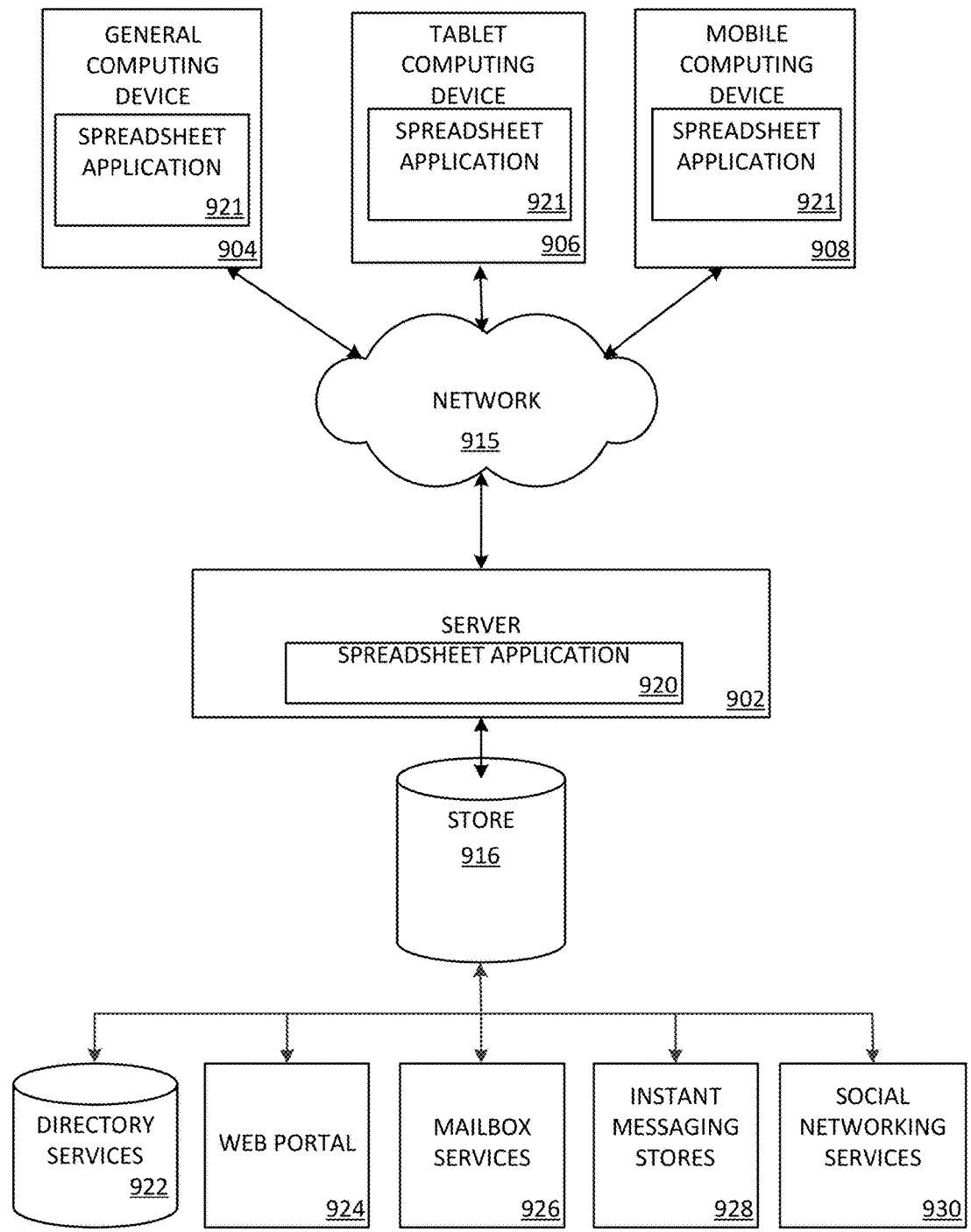
FIG. 9 illustrates one aspect of the architecture of a system for processing data received at a computing system from a remote source, such as a general computing device (e.g., personal computer), tablet computing device, or mobile computing device, as described above.

FIG. 9 illustrates one aspect of the architecture of a system for processing data received at a computing system from a remote source, such as a general computing device 904 (e.g., personal computer), tablet computing device 906, or mobile computing device 908, as described above.

Content displayed at server device 902 may be stored in different communication channels or other storage types. For example, various documents may be stored using a directory service 922, a web portal 924, a mailbox service 926, an instant messaging store 928, or a social networking service 930. The spreadsheet application 921 may be employed by a client that communicates with server device 902, and/or the spreadsheet application 920 may be employed by server device 902. The server device 902 may provide data to and from a client computing device such as a general computing device 904, a tablet computing device 906 and/or a mobile computing device 908 (e.g., a smart phone) through a network 915. By way of example, the computer system described above may be embodied in a general computing device 904 (e.g., personal computer), a tablet computing device 906 and/or a mobile computing device 908 (e.g., a smart phone). Any of these embodiments of the computing devices may obtain content from the store 916, in addition to receiving graphical data useable to either be pre-processed at a graphic-originating system or post-processed at a receiving computing system.

As should be appreciated, FIG. 9 is described for purposes of illustrating the present methods and systems and is not intended to limit the disclosure to a particular sequence of steps or a particular combination of hardware or software components.

Figure 10:
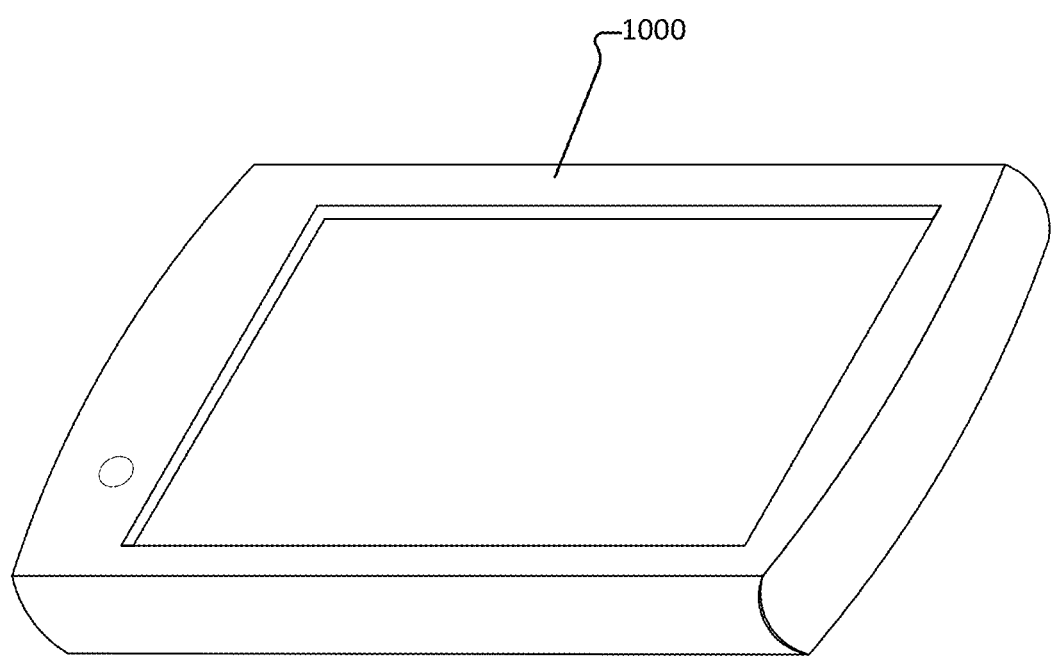
FIG. 10 illustrates an exemplary tablet computing device that may execute one or more aspects disclosed herein.

FIG. 10 illustrates an exemplary tablet computing device 1000 that may execute one or more aspects disclosed herein.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 10 is described for purposes of illustrating the present methods and systems and is not intended to limit the disclosure to a particular sequence of steps or a particular combination of hardware or software components. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer implemented method for generating a deck view on a mobile computing device, the method comprising:
receiving, at the mobile computing device, a spreadsheet storing data that is organized according to a plurality of rows and associated with a plurality of columns;
generating a deck view including at least two row objects, wherein each of the at least two row objects displays data of two or more cells associated with one of the plurality of rows and includes information from two or more of the associated plurality of columns, wherein an organization of the data in the deck view is different than an organization of the data in the spreadsheet;
displaying the deck view on the mobile computing device; and
receiving, at the mobile computing device, a selection to display a card view, comprising selecting one of: a row as viewed from the spreadsheet or a row object as viewed from the deck view.

2. The computer implemented method of claim 1, further comprising:
editing, from the deck view, the information included in the at least one row object; and
based on editing the information from the deck view, updating the spreadsheet.

3. The computer implemented method of claim 1, further comprising:
customizing the deck view, wherein customizing the deck view comprises at least one of:
displaying information from a column of the associated plurality of columns not displayed in the deck view, and hiding information from a column of the associated plurality of columns displayed in the deck view.

4. The computer implemented method of claim 1, further comprising:
receiving a swipe command associated with the at least one row object;
in response to receiving the swipe command, displaying a swipe command user interface including one or more selectable commands.

5. The computer implemented method of claim 4, wherein the one or more selectable commands enable at least one of editing, sharing, and customizing the deck view.

6. The computer implemented method of claim 1, wherein the deck view further displays a summary.

7. A computer implemented method for generating a card view on a mobile computing device, the method comprising:
receiving, at the mobile computing device, a spreadsheet storing data that is organized according to a plurality of rows and associated with a plurality of columns;
generating a card view including a row object, wherein the row object includes cell data of at least two cells associated with one of the plurality of rows and header information associated with at least two corresponding columns of the plurality of columns, wherein an organization of the cell data in the card view is different than an organization of the cell data in the spreadsheet;
displaying the card view on the mobile computing device;
receiving a swipe command associated with the cell data on a display of the mobile device;
in response to receiving the swipe command, displaying a swipe command user interface including one or more selectable commands; and
in response to receiving selection of at least one selectable command, displaying a card view including another row object representing another one of the plurality of rows of the spreadsheet.

8. The computer implemented method of claim 7, further comprising:

editing, from the card view, the information included in the row object; and based on editing the information from the card view, updating the spreadsheet.

9. The computer implemented method of claim 7, further comprising:

customizing the card view, wherein customizing the card view comprises at least one of:

displaying information from a column of the associated plurality of columns not displayed in the card view, and hiding information from a column of the associated plurality of columns displayed in the card view.

10. The computer implemented method of claim 7, wherein the one or more selectable commands include at least one of: a share command, a flag command, a delete command, a comment command, and a remind me command.

11. The computer implemented method of claim 7, wherein the card view occupies an entire size of a display of the mobile computing device.

12. The computer implemented method of claim 7, further comprising:

receiving the swipe command in a right direction.

13. The computer implemented method of claim 7, further comprising:

in response to receiving a selection to switch to the card view:

generating a column card view including a column object, wherein the column object includes data of one or more cells associated with one of the plurality of columns and includes cell information associated with two or more of the associated plurality of rows; and displaying the column card view on the mobile computing device.

14. A system comprising:

at least one processing unit; and at least one memory storing computer executable instructions that, when executed by the at least one processing unit, cause the system to perform a method, the method comprising:

receiving, at the mobile computing device, a spreadsheet storing data that is organized according to a plurality of rows and associated with a plurality of columns;

in response to receiving, at the mobile computing device, a selection to display a deck view:

generating the deck view including at least two row objects, wherein each of the at least two row objects includes data of at least one cell associated with one of the plurality of rows and includes header information from at least one corresponding column of the associated plurality of columns, wherein an organization of the data in the deck view is different than an organization of the data in the spreadsheet;

displaying the deck view on the mobile computing device; and receiving, at the mobile computing device, a selection to display a card view comprising selecting one of: a row as viewed from the spreadsheet or a row object as viewed from the deck view.

15. The system of claim 14, wherein receiving, at the mobile computing device, the selection to display the deck view further comprises selection of at least one row as viewed from the spreadsheet.

16. The system of claim 14, wherein one of the at least two row objects displayed in the deck view includes formatting applied to the spreadsheet.

17. The system of claim 14, wherein the row object displayed in the card view includes formatting applied to the spreadsheet.

18. The system of claim 14, wherein at least one of the deck view and the card view occupies an entire area of a display of the mobile computing device.

19. The system of claim 14, further comprising:

receiving a swipe command associated with at least one of the at least two row objects;

in response to receiving the swipe command, displaying a swipe command user interface including one or more selectable commands.

20. The system of claim 19, wherein the one or more selectable commands enable at least one of editing, sharing, and customizing the deck view.

* * * * *